(12) United States Patent
Carlini et al.

(10) Patent No.: US 8,778,069 B2
(45) Date of Patent: Jul. 15, 2014

(54) PHASE CHANGE INKS CONTAINING OLIGOMERIC ROSIN ESTERS

(71) Applicant: Xerox Corporation, Norwalk, CT (US)

(72) Inventors: Rina Carlini, Oakville (CA); Adela Goredema, Mississauga (CA); Edward G. Zwartz, Mississauga (CA); Kentaro Morimitsu, Mississauga (CA); Gial Song, Milton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/680,271

(22) Filed: Nov. 19, 2012

(65) Prior Publication Data

US 2014/0137767 A1    May 22, 2014

(51) Int. Cl.
 *C09D 11/02* (2014.01)
(52) U.S. Cl.
 USPC .................................. 106/31.29; 106/31.61
(58) Field of Classification Search
 CPC ........................................................ C09D 11/34
 USPC ........................................... 106/31.29, 31.61
 See application file for complete search history.

(56) References Cited

U.S. PATENT DOCUMENTS

| | | | | |
|---|---|---|---|---|
| 5,006,170 A | * | 4/1991 | Schwarz et al. | 106/31.3 |
| 5,780,528 A | * | 7/1998 | Titterington et al. | 523/161 |
| 5,919,839 A | * | 7/1999 | Titterington et al. | 523/161 |
| 7,578,874 B2 | * | 8/2009 | Benjamin et al. | 106/31.29 |
| 2008/0098930 A1 | * | 5/2008 | Wong et al. | 106/31.29 |
| 2012/0157592 A1 | * | 6/2012 | Hong et al. | 524/145 |

OTHER PUBLICATIONS

Bardyshev, I.I., "Diterpenoid Carboxylic Acid Anhydrides of the Abietane, Pimarane, and Isopimarane Series," Russian Journal of Organic Chemistry, vol. 35, No. 1, 1999, pp. 41-55.
Belelie et al., U.S. Appl. No. 13/095,636, filed Apr. 27, 2011, entitled "Solid Ink Compositions Comprising Crystalline-Amorphous Mixtures".
Carlini et al., U.S. Appl. No. 13/196,157, filed Aug. 2, 2011, entitled "Phase Change Inks Containing Oxazoline Compounds and Polyterpene Resins".
Goredema et al., U.S. Appl. No. 13/196,227, filed Aug. 2, 2011, entitled "Phase Change Inks Containing Crystalline Trans-Cinnamic Diesters and Amorphous Isosorbide Oligomers."
Morimitsu et al., U.S. Appl. No. 13/095,715, filed Apr. 27, 2011, entitled "Solid Ink Compositions Comprising Crystalline Esters of Tartaric Acid".
Farrugia et al., U.S. Appl. No. 12/714,677, filed Mar. 1, 2010, entitled "Bio-Based Amorphous Polyester Resins for Emulsion Aggregation Toners".

(Continued)

*Primary Examiner* — Veronica F Faison
(74) *Attorney, Agent, or Firm* — MDIP LLC

(57) ABSTRACT

Disclosed is a phase change ink comprising an ink carrier which comprises a crystalline component and an amorphous rosin ester. In specific embodiments, the crystalline component can be a trans-cinnamic diester, a diester of tartaric acid, or a diurethane. In specific embodiments, the ink exhibits a peak melting point of no more than about 150° C., an onset crystallization temperature of no less than about 60° C., a melt viscosity within the temperature range of from about 100° C. to about 130° C. of from about 5 cps to about 22 cps, a peak solidification viscosity at about 50° C. of no less than about $1 \times 10^6$ cps, and a hardness at about 25° C. of at least about 70.

18 Claims, 3 Drawing Sheets

(56) References Cited

OTHER PUBLICATIONS

Sacripante et al., U.S. Appl. No. 13/007,683, filed Jan. 17, 2011, entitled "Rosin-Based Resin and Toner Containing Same".
Farrugia et al., U.S. Appl. No. 13/108,166, filed May 16, 2011, entitled "Rosin-Based Resin and Toner Containing Same".
Zhou et al., U.S. Appl. No. 13/326,242, filed Dec. 14, 2011, entitled "Toners With Improved Dielectric Loss".
Carlini et al, U.S., filed concurrently herewith, entitled "Oligomeric Rosin Esters for Use in Inks".
Goredema et al., U.S., filed concurrently herewith, entitled "Ester Resin Compositions".
Goredema et al., U.S., filed concurrently herewith, entitled "Ink Compositions Incorporating Ester Resins".
Goredema et al., U.S., filed concurrently herewith, entitled "Bio-renewable Fast Crystallizing Phase Change Inks".
Van Besien et al., U.S., filed concurrently herewith, entitled "Bio-Renewable Phase Change Inks Comprising Recycled Resin Materials".
H. P. Kaufmann et al., "Isomeric naphthoic sulfimides, a contribution to the theory of dulcigenic groups," Berichte der Deutschen Chemischen Gesellschaft [Abteilung] B: Abhandlungen, vol. 55B, pp. 1499-508. (Abstract).

\* cited by examiner

PHASE CHANGE INKS CONTAINING OLIGOMERIC ROSIN ESTERS

CROSS-REFERENCE TO RELATED APPLICATIONS

Reference is made to U.S. application Ser. No. 13/095,636, filed Apr. 27, 2011, entitled "Solid Ink Compositions Comprising Crystalline-Amorphous Mixtures," with the named inventors Jennifer L. Belelie, Peter G. Odell, Stephan V. Drappel, Kentaro Morimitsu, Naveen Chopra, Marcel P. Breton, Gabriel Iftime, C. Geoffrey Allen, and Rina Carlini, the disclosure of which is totally incorporated herein by reference.

Reference is made to U.S. application Ser. No. 13/196,157, filed Aug. 2, 2011, entitled "Phase Change Inks Containing Oxazoline Compounds and Polyterpene Resins," with the named inventors Rina Carlini, Adela Goredema, Guerino G. Sacripante, Caroline M. Turek, and Edward G. Zwartz, the disclosure of which is totally incorporated herein by reference.

Reference is made to U.S. application Ser. No. 13/196,227, filed Aug. 2, 2011, entitled "Phase Change Inks Containing Crystalline Trans-Cinnamic Diesters and Amorphous Isosorbide Oligomers," with the named inventors Adela Goredema, Rina Carlini, Caroline M. Turek, Guerino G. Sacripante, and Edward G. Zwartz, the disclosure of which is totally incorporated herein by reference.

Reference is made to U.S. application Ser. No. 13/095,715, filed Apr. 27, 2011, entitled "Solid Ink Compositions Comprising Crystalline Esters of Tartaric Acid," with the named inventors Kentaro Morimitsu, Jennifer L. Belelie, Naveen Chopra, Stephan V. Drappel, Corey Tracy, and Peter G. Odell, the disclosure of which is totally incorporated herein by reference.

Reference is made to U.S. application Ser. No. 12/714,677, filed Mar. 1, 2010, entitled "Bio-Based Amorphous Polyester Resins for Emulsion Aggregation Toners," with the named inventors Valerie M. Farrugia, Guerino G. Sacripante, Ke Zhou, Edward G. Zwartz, and Michael S. Hawkins, the disclosure of which is totally incorporated herein by reference.

Reference is made to U.S. application Ser. No. 13/007,683, filed Jan. 17, 2011, entitled "Rosin-Based Resin and Toner Containing Same," with the named inventors Guerino G. Sacripante, Ke Zhou, Edward G. Zwartz, Paul J. Gerroir, and Michael S. Hawkins, the disclosure of which is totally incorporated herein by reference.

Reference is made to U.S. application Ser. No. 13/108,166, filed May 16, 2011, entitled "Rosin-Based Resin and Toner Containing Same," with the named inventors Valerie M. Farrugia, Ke Zhou, Guerino G. Sacripante, Rina Carlini, and Paul J. Gerroir, the disclosure of which is totally incorporated herein by reference.

Reference is made to U.S. application Ser. No. 13/326,242, filed Dec. 14, 2011, entitled "Toners With Improved Dielectric Loss," with the named inventors Ke Zhou, Rina Carlini, Daryl W. Vanbesien, Cuong Vong, Karen A. Moffat, and Richard P. N. Veregin, the disclosure of which is totally incorporated herein by reference.

Reference is made to U.S. application Ser. No. 13/680,237 filed Nov. 19, 2012, entitled "Oligomeric Rosin Esters for Use in Inks," with the named inventors Rina Carlini and Adela Goredema, the disclosure of which is totally incorporated herein by reference.

Reference is made to U.S. application Ser. No. 13/680,200 filed Nov. 19, 2012, entitled "Ester Resin Compositions," with the named inventors Adela Goredema, Rina Carlini, Jennifer L. Belelie, Naveen Chopra, and Kentaro Morimitsu, the disclosure of which is totally incorporated herein by reference.

Reference is made to U.S. application Ser. No. 13/680,322 filed Nov. 19, 2012, entitled "Ink Compositions Incorporating Ester Resins," with the named inventors Adela Goredema, Jennifer L. Belelie, Rina Carlini, Naveen Chopra, Kentaro Morimitsu, Corey L. Tracy, and Nathan M. Bamsey, the disclosure of which is totally incorporated herein by reference.

Reference is made to U.S. application Ser. No. 13/681,106 filed Nov. 19, 2012, entitled "Bio-renewable Fast Crystallizing Phase Change Inks," with the named inventors Adela Goredema, Jennifer Belelie, Kentaro Morimitsu, Guerino Sacripante, Gabriel Iftime, Caroline Turek, Corey Tracy and Nathan Bamsey, the disclosure of which is totally incorporated herein by reference.

Reference is made to U.S. Pat. No. 8,591,640 filed Nov. 19, 2012, entitled "Bio-renewable Fast Crystallizing Phase Change Inks," with the named inventors Adela Goredema, Jennifer Belelie, Kentaro Morimitsu, Gabriel Iftime, Rina Carlini, Caroline Turek, Corey Tracy and Nathan Bamsey, the disclosure of which is totally incorporated herein by reference.

Reference is made to U.S. application Ser. No. 13/681,206 filed Nov. 19, 2012, entitled "Bio-Renewable Phase Change Inks Comprising Recycled Resin Materials," with the named inventors Daryl W. Vanbesien, Guerino Sacripante, Adela Goredema, Naveen Chopra, and Gabriel Iftime, the disclosure of which is totally incorporated herein by reference.

BACKGROUND

Disclosed herein are phase change inks containing amorphous and crystalline components, wherein the amorphous component is an oligomeric rosin-derived ester.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, or the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, or the like), the droplets solidify immediately upon contact with the substrate, so that migration of ink along the printing medium is prevented and dot quality is improved.

Known phase change inks generally contain components such as crystalline waxes and other materials that enable sharp and rapid phase transitions from the molten liquid state to the solid state. Many known phase change inks, however, exhibit disadvantages such as poor adhesion to coated paper substrates, resulting in poor scratch-resistance, poor image robustness, hard and brittle properties, poor 'paper fold' performance such as cracking and creasing of the image when the document is folded, and document offset. Further, the nonpolarity of these ink components often leads to compatibility issues with commonly available dyes and pigments, resulting in the need for more expensive or custom-designed colorants to ensure good solubility or dispersibility in the ink carrier and good long-term thermal stability to prevent colorant degradation or colorant migration.

Customers have also created a demand for materials that are bio-based, or derived at least partly from renewable resources. Energy and environmental policies, increasing and volatile oil prices, and public/political awareness of the rapid depletion of global fossil reserves has created a need to find sustainable monomers derived from biomaterials. By using bio-renewable feedstock, manufacturers can reduce their carbon footprint and move to a zero-carbon or even a carbon-neutral footprint. Bio-based polymers can also be very attractive in terms of specific energy and emission savings. Using bio-based feedstock can help provide new sources of income for domestic agriculture and reduce the economic risks and uncertainty associated with reliance on petroleum imported from unstable regions.

Accordingly, while known materials and processes are suitable for their intended purposes, there is a need for improved phase change inks. In addition, there is a need for phase change inks that exhibit sharp and rapid phase transitions from the molten liquid state to the solid state. Further, there is a need for phase change inks that exhibit good adhesion to coated paper substrates. Additionally, there is a need for phase change inks that exhibit good scratch-resistance. There is also a need for phase change inks that exhibit good image robustness. In addition, there is a need for phase change inks that exhibit good "paper fold" performance and reduced cracking and creasing of the image when the document is folded. Further, there is a need for phase change inks that exhibit good document offset performance. Additionally, there is a need for phase change inks that exhibit good compatibility with commonly available colorants. In addition, a need remains for phase change inks that contain at least some materials at least partly derived from renewable resources. Further, a need remains for phase change inks that can be prepared at desirably low cost. Additionally, a need remains for phase change inks that contain some biodegradable components.

SUMMARY

Disclosed herein is a phase change ink comprising an ink carrier which comprises: (a) a crystalline component; and (b) an amorphous rosin ester. Also disclosed is a phase change ink comprising an ink carrier which comprises: (a) a crystalline component; and (b) an amorphous rosin ester; said ink exhibiting: (1) a melt viscosity within the temperature range of from about 100° C. to about 130° C. of from about 5 to about 22 cps; (2) a peak solidification viscosity at about 50° C. of no less than about $1 \times 10^6$ cps; and (3) a hardness at about 25° C. of at least about 70. Further disclosed is a phase change ink comprising an ink carrier which comprises: (a) a crystalline component, present in the carrier in an amount of from about 60 to about 95 percent by weight of the ink carrier, which is: (1) a trans-cinnamic diester; (2) a diester of tartaric acid; or (3) a diurethane; and (b) an amorphous rosin ester, present in the ink in an amount of from about 5 to about 40 percent by weight of the ink carrier, which is: (1) of the formula

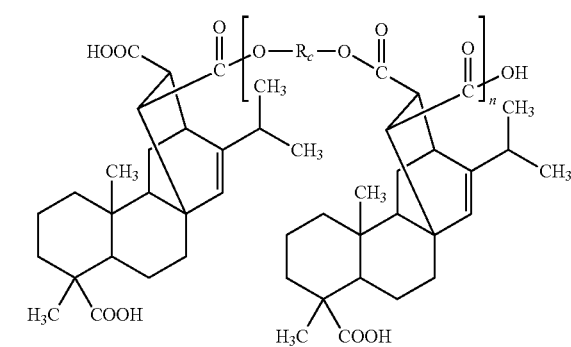

wherein $R_c$ is: (i) an alkylene group, including substituted unsubstituted alkylene groups, and wherein hetero atoms either may or may not be present in the alkylene group; (ii) an arylene group, including substituted and unsubstituted arylene groups, and wherein hetero atoms either may or may not be present in the arylene group; (iii) an arylalkylene group, including substituted and unsubstituted arylalkylene groups, and wherein hetero atoms either may or may not be present in either or both of the alkyl portion and the aryl portion of the arylalkylene group; or (iv) an alkylarylene group, including substituted and unsubstituted alkylarylene groups, and wherein hetero atoms either may or may not be present in either or both of the alkyl portion and the aryl portion of the alkylarylene group; and n is an integer representing the number of repeat monomer units; or (2) of the formula

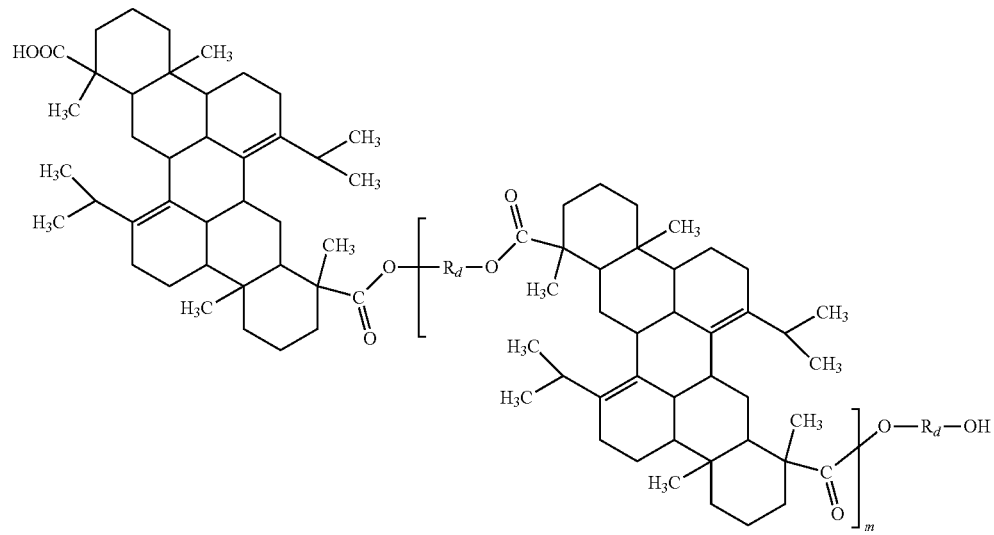

wherein $R_d$ is: (i) an alkylene group, including substituted unsubstituted alkylene groups, and wherein hetero atoms either may or may not be present in the alkylene group; (ii) an arylene group, including substituted and unsubstituted arylene groups, and wherein hetero atoms either may or may not be present in the arylene group; (iii) an arylalkylene group, including substituted and unsubstituted arylalkylene groups, and wherein hetero atoms either may or may not be present in either or both of the alkyl portion and the aryl portion of the arylalkylene group; or (iv) an alkylarylene group, including substituted and unsubstituted alkylarylene groups, and wherein hetero atoms either may or may not be present in either or both of the alkyl portion and the aryl portion of the alkylarylene group; and m is an integer representing the number of repeat monomer units; said ink exhibiting: (A) a peak melting point of no more than about 150° C.; (B) an onset crystallization temperature of no less than about 60° C.; (C) a melt viscosity within the temperature range of from about 100° C. to about 130° C. of from about 5 cps to about 22 cps; (D) a peak solidification viscosity at about 50° C. of no less than about $1 \times 10^6$ cps; and (E) a hardness at about 25° C. of at least about 70.

DETAILED DESCRIPTION

Definitions

Figure 1:
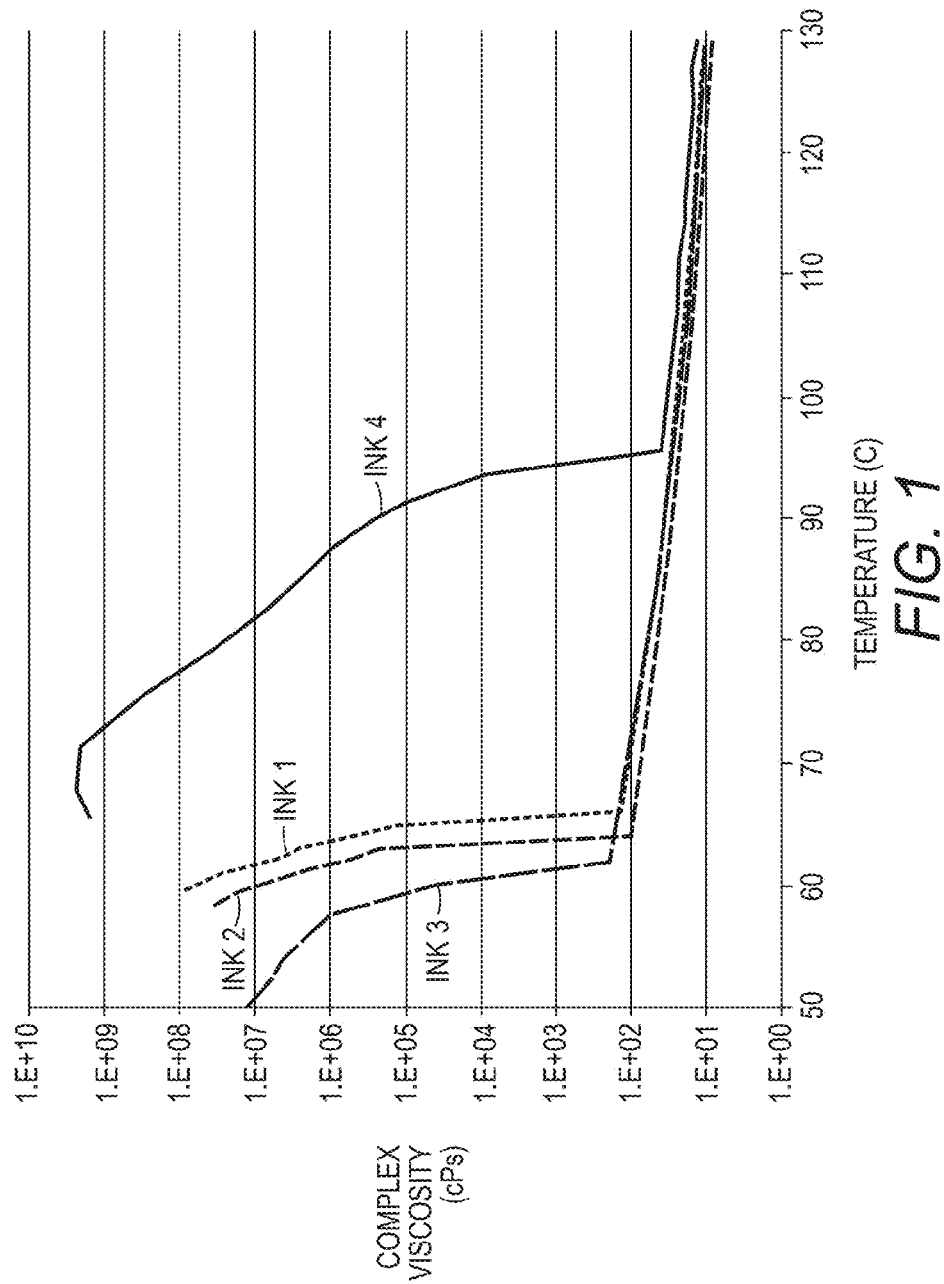
FIG. 1 is a plot showing the rheology characteristics for inks as disclosed herein.

As used herein:

Alkyl refers to a monovalent alliphatic hydrocarbon group having no aromatic moieties or substituents thereon;

Alkylene refers to a divalent or higher alliphatic hydrocarbon group having no aromatic moieties or substituents thereon;

Aryl refers to a monovalent aromatic hydrocarbon group having no aliphatic moieties or substituents thereon;

Arylene refers to a divalent or higher aromatic hydrocarbon group having no aliphatic moieties or substituents thereon;

Arylalkyl refers to a monovalent aliphatic hydrocarbon group having one or more aromatic moieties or substituents thereon, wherein the point of attachment of the group is through the aliphatic group, such as benzyl or the like;

Arylalkylene refers to a divalent or higher aliphatic hydrocarbon group having one or more aromatic moieties or substituents thereon, wherein the points of the attachment of the group are either (1) all through the aliphatic group, with an example being

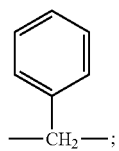

or (2) with at least one through the aliphatic group and at least one through the aromatic group, with an example being

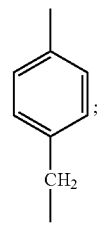

Alkylaryl refers to a monovalent aromatic hydrocarbon group having one or more aliphatic moieties or substituents thereon, wherein the point of attachment of the group is through the aromatic group, such as tolyl or the like;

Alkylarylene refers to a divalent or higher aromatic hydrocarbon group having one or more aliphatic moieties or substituents thereon, wherein the points of attachment of the group are both through the aromatic group, with an example being

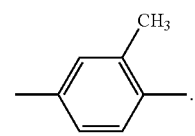

Amorphous Component

The inks disclosed herein contain an amorphous resin derived from rosin and a crystalline component.

The amorphous resins disclosed herein are derived from rosin. Rosin is generally derived from conifers and other plants and comprises mixtures of organic acids such as abietic acid and related compounds and isomers, including (but not limited to) neoabietic acid, palustric acid, pimaric acid, levopimaric acid, isopimaric acid, dehydroabietic acid, sandaracopimaric acid, and the like:

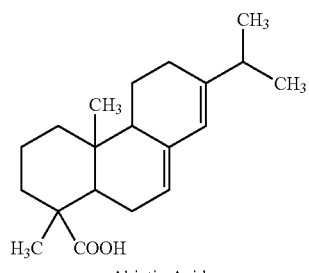
Abietic Acid

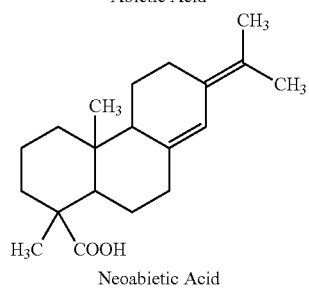
Neoabietic Acid

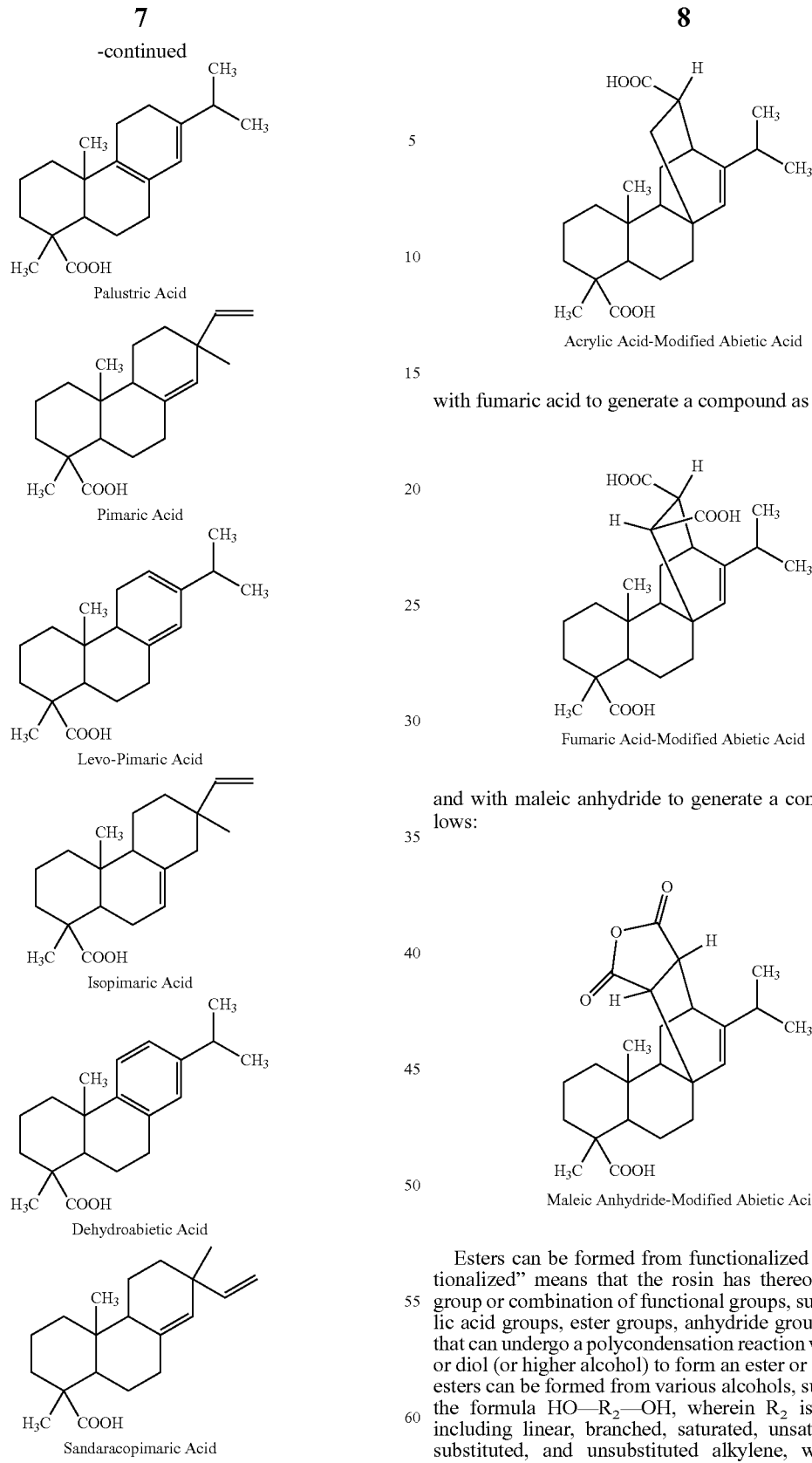

These materials can be further reacted with acids or anhydrides to provide monomers useful for making oligoester resins. For example, abietic acid reacts with acrylic acid to generate a compound as follows:

with fumaric acid to generate a compound as follows:

and with maleic anhydride to generate a compound as follows:

Esters can be formed from functionalized rosins. "Functionalized" means that the rosin has thereon a functional group or combination of functional groups, such as carboxylic acid groups, ester groups, anhydride groups, or the like, that can undergo a polycondensation reaction with an alcohol or diol (or higher alcohol) to form an ester or oligoester. The esters can be formed from various alcohols, such as diols, of the formula HO—$R_2$—OH, wherein $R_2$ is (1) alkylene, including linear, branched, saturated, unsaturated, cyclic, substituted, and unsubstituted alkylene, wherein hetero atoms, such as oxygen, nitrogen, sulfur, silicon, phosphorus, boron, and the like either may or may not be present in alkylene, in one embodiment with at least about 2 carbons, in another embodiment with at least about 4 carbons, and in yet another embodiment with at least about 6 carbons, and in one embodiment with no more than about 40 carbons, in another embodiment with no more than about 22 carbons, and in yet another embodiment with no more than about 12 carbons, although the number of carbons can be outside of these ranges, (2) arylene, including substituted and unsubstituted arylene, wherein hetero atoms, such as oxygen, nitrogen, sulfur, silicon, phosphorus, boron, and the like either may or may not be present in arylene, in one embodiment with at least about 6 carbons, in another embodiment with at least about 8 carbons, and in yet another embodiment with at least about 12 carbons, and in one embodiment with no more than about 40 carbons, in another embodiment with no more than about 22 carbons, and in yet another embodiment with no more than about 16 carbons, although the number of carbons can be outside of these ranges, such as phenylene or the like, (3) arylalkylene, including substituted and unsubstituted arylalkylene, wherein the alkyl portion of arylalkylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of arylalkylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as benzylene or the like, or (4) alkylarylene, including substituted and unsubstituted alkylarylene, wherein the alkyl portion of alkylarylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of alkylarylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as tolylene or the like; such as triethylene glycol, dipropylene glycol, ethylene glycol, diethylene glycol, other alkylene glycols such as propylene glycol, 1,3- and 1,4-butanediols, 1,6-hexanediol, 3-methyl-1,5-pentanediol, neopentyl glycol, and the like; triols, of the formula $R_3$—$(OH)_3$, wherein $R_3$ is (1) alkylene, including linear, branched, saturated, unsaturated, cyclic, substituted, and unsubstituted alkylene, wherein hetero atoms, such as oxygen, nitrogen, sulfur, silicon, phosphorus, boron, and the like either may or may not be present in alkylene, in one embodiment with at least about 1 carbon, in another embodiment with at least about 4 carbons, and in yet another embodiment with at least about 6 carbons, and in one embodiment with no more than about 40 carbons, in another embodiment with no more than about 22 carbons, and in yet another embodiment with no more than about 12 carbons, although the number of carbons can be outside of these ranges, (2) arylene, including substituted and unsubstituted arylene, wherein hetero atoms, such as oxygen, nitrogen, sulfur, silicon, phosphorus, boron, and the like either may or may not be present in arylene, in one embodiment with at least about 6 carbons, in another embodiment with at least about 8 carbons, and in yet another embodiment with at least about 12 carbons, and in one embodiment with no more than about 40 carbons, in another embodiment with no more than about 22 carbons, and in yet another embodiment with no more than about 12 carbons, although the number of carbons can be outside of these ranges, such as phenylene or the like, (3) arylalkylene, including substituted and unsubstituted arylalkylene, wherein the alkyl portion of arylalkylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of arylalkylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as benzylene or the like, or (4) alkylarylene, including substituted and unsubstituted alkylarylene, wherein the alkyl portion of alkylarylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of alkylarylene, in one embodiment with at least about 7 carbons, in another embodiment with at least about 8 carbons, and in yet another embodiment with at least about 12 carbons, and in one embodiment with no more than about 40 carbons, in another embodiment with no more than about 22 carbons, and in yet another embodiment with no more than about 16 carbons, although the number of carbons can be outside of these ranges, such as tolylene or the like; such as glycerol, trimethylolpropane, trimethylolethane, hexane triols, and the like; tetrols, of the formula $R_4$—$(OH)_4$, wherein $R_4$ is (1) alkylene, including linear, branched, saturated, unsaturated, cyclic, substituted, and unsubstituted alkylene, wherein hetero atoms, such as oxygen, nitrogen, sulfur, silicon, phosphorus, boron, and the like either may or may not be present in alkylene, in one embodiment with at least about 1 carbon, in another embodiment with at least about 4 carbons, and in yet another embodiment with at least about 6 carbons, and in one embodiment with no more than about 40 carbons, in another embodiment with no more than about 22 carbons, and in yet another embodiment with no more than about 12 carbons, although the number of carbons can be outside of these ranges, (2) arylene, including substituted and unsubstituted arylene, wherein hetero atoms, such as oxygen, nitrogen, sulfur, silicon, phosphorus, boron, and the like either may or may not be present in arylene, in one embodiment with at least about 6 carbons, in another embodiment with at least about 8 carbons, and in yet another embodiment with at least about 12 carbons, and in one embodiment with no more than about 40 carbons, in another embodiment with no more than about 22 carbons, and in yet another embodiment with no more than about 12 carbons, although the number of carbons can be outside of these ranges, such as phenylene or the like, (3) arylalkylene, including substituted and unsubstituted arylalkylene, wherein the alkyl portion of arylalkylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of arylalkylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as benzylene or the like, or (4) alkylarylene, including substituted and unsubstituted alkylarylene, wherein the alkyl portion of alkylarylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of alkylarylene, in one embodiment with at least about 7 carbons, in another embodiment with at least about 8 carbons, and in yet another embodiment with at least about 12 carbons, and in one embodiment with no more than about 40 carbons, in another embodiment with no more than about 22 carbons, and in yet another embodiment with no more than about 16 carbons, although the number of carbons can be outside of these ranges, such as tolylene or the like; such as pentaerythritol, alpha-methylglucoside, diglycerol, and the like, wherein the substituents on the substituted alkyl, alkylene, aryl, arylene, arylalkyl, arylalkylene, alkylaryl, and alkylarylene groups can be (but are not limited to)hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, and the like, wherein two or more substituents can be joined together to form a ring.

Further, rosins can be dimerized to provide materials having two or more carboxylic acid groups thereon. Dimerized rosins are also often referred to in the art as polymerized rosins, although "polymerized rosin" also typically refers to the resinous mixture comprising unrefined reaction products containing non-dimerizable rosin acids such as dehydroabietic acid, rosin acids containing some unsaturation which do not react, a number of different types of polymerized rosin acids including dimerized rosin acids, esters, rosin acid anhydrides, and non-saponifiable substances. Dimerized or polymerized rosins can be made as described in, for example, U.S. Pat. Nos. 2,017,866, 2,108,928, 2,136,525, 2,307,641, 2,322,316, 2,328,681, 2,375,618, 2,492,146, 2,515,218, 4,414,146, and 4,536,333, and in Parkin, Jr. et al., "Thermal Dimerization of Rosin," *Ind. Eng. Chem. Prod. Res. Dev.,* 8(3), pp. 304-306 (1969), Sinclair et al., "Influence of Reaction Conditions on the Dimerization of Abietic Acid and Rosin," *Ind. Eng. Chem. Prod. Res. Dev.,* 9(1), pp. 60-65 (1970), and Fujii et al., ""Dimeric Components from the Dimerization of Abietic Acid," *JAOCS,* 64(8), pp. 1144-1149 (1987), the disclosures of each of which are totally incorporated herein by reference. Dimerized rosin is believed to have a number of different structures, as in, for example, the following compound

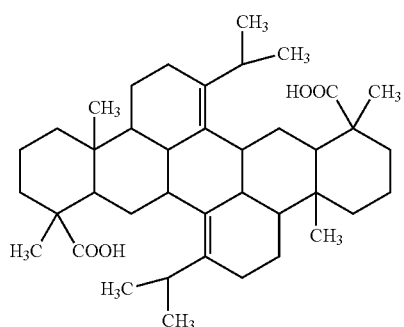

Dimerized Rosin available as DYMEREX from Eastman Chemical Co., as well as the following other proposed structures:

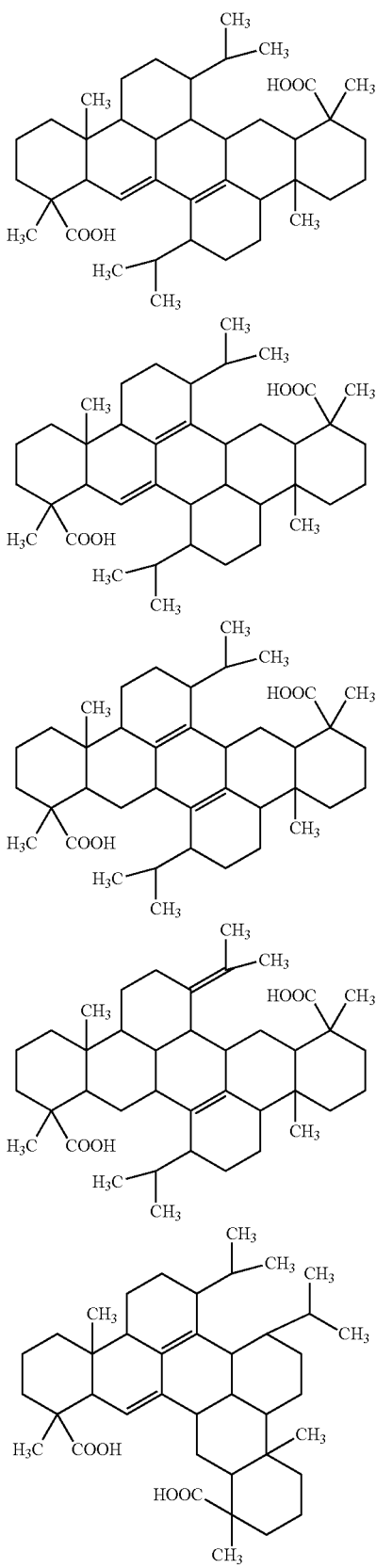

-continued

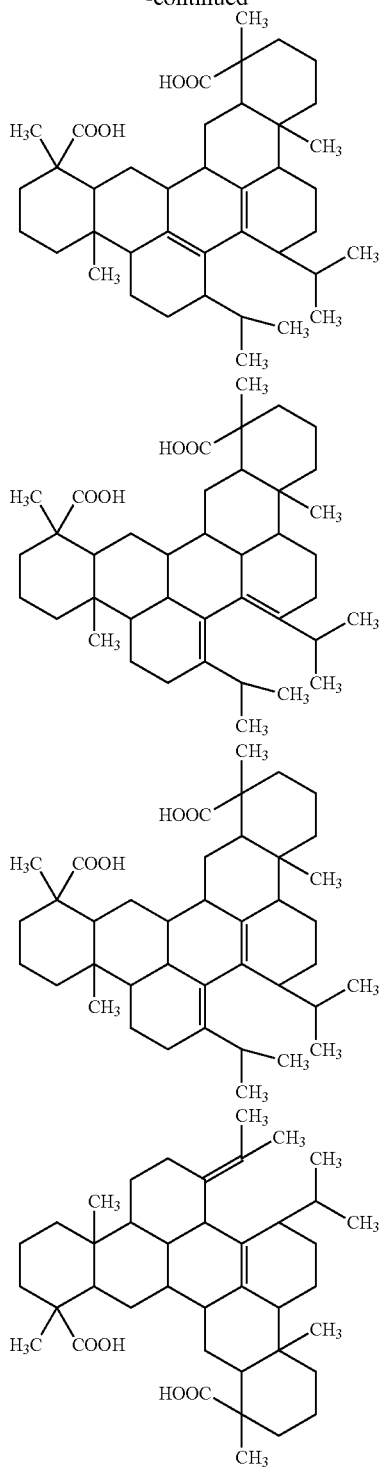

and the like, and all dimerized rosins are suitable for the purposes of the present disclosure.

The reaction conditions between rosin acids and the acids and anhydrides are known in the art and are described in, for example, "Preparation of Acrylic Modified Rosin," Noah J. Halbrook and Ray V. Lawrence, *Ind. Eng. Chem. Prod. Res. Develop.*, Vol. 11, No. 2, p. 200-202, 1972, "Fumaric Modified Resin," Noah J. Halbrook and Ray V. Lawrence, *Industrial and Engineering Chemistry*, Vol. 50, No. 3, March 1958, pp. 321-322, and "Rosin-based acid anhydrides as alternatives to petrochemical curing agents," Xiaoqing Liu, Wenbo Xin, and Jinwen Zhang, *Green Chem.*, 2009, 11, 1018-1025, the disclosures of each of which are totally incorporated herein by reference.

In one specific embodiment, the rosin is reacted with diol or higher alcohol (hereinafter collectively referred to as "alcohols") specifically selected to be bio-renewable. Examples of bio-renewable alcohols include (but are not limited to) 1,4-butanediol, 1,3-propanediol, cyclohexanedimethanol, of the formula

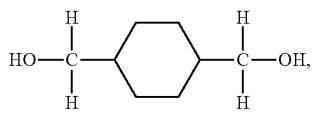

or the like, as well as mixtures thereof.

When a rosin derivative having two or more acid functional groups is reacted with a diol, triol, tetrol, or higher alcohol, oligomers (having, in one specific embodiment, from about 1 to about 10 repeat monomer units) can be formed. Examples of oligomers include those formed from the reaction of a rosin having three or more acid functional groups with a diol, such as fumaric acid-modified rosin with a diol, as follows:

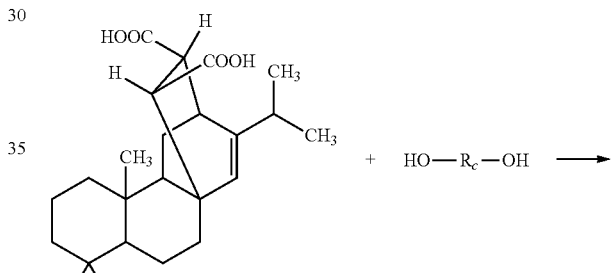

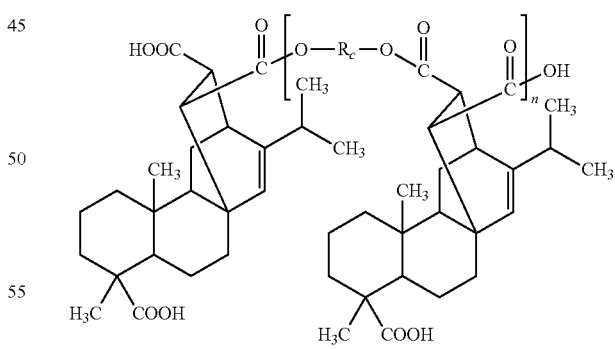

wherein $R_c$ is:

(i) alkylene, including linear, branched, saturated, unsaturated, cyclic, substituted, and unsubstituted alkylene, wherein hetero atoms, such as oxygen, nitrogen, sulfur, silicon, phosphorus, boron, and the like either may or may not be present in alkylene, in one embodiment with at least about 2 carbons, in another embodiment with at least about 4 carbons, and in yet another embodiment with at least about 6 carbons, and in one embodiment with no more than about 40 carbons, in another embodiment with no more than about 22 carbons, and in yet another embodiment with no more than about 12 carbons, although the number of carbons can be outside of these ranges;

(ii) arylene, including substituted and unsubstituted arylene, wherein hetero atoms, such as oxygen, nitrogen, sulfur, silicon, phosphorus, boron, and the like either may or may not be present in arylene, in one embodiment with at least about 6 carbons, in another embodiment with at least about 8 carbons, and in yet another embodiment with at least about 12 carbons, and in one embodiment with no more than about 40 carbons, in another embodiment with no more than about 22 carbons, and in yet another embodiment with no more than about 16 carbons, although the number of carbons can be outside of these ranges, such as phenylene or the like;

(iii) arylalkylene, including substituted and unsubstituted arylalkylene, wherein the alkyl portion of arylalkylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of arylalkylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as benzylene or the like; or (iv) alkylarylene, including substituted and unsubstituted alkylarylene, wherein the alkyl portion of alkylarylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of alkylarylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as tolylene or the like; wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, and the like, wherein two or more substituents can be joined together to form a ring, and n is an integer representing the number of repeat monomer units, being in one embodiment at least about 1, and in another embodiment at least about 2, and in one embodiment no more than about 10, although the number can be outside of these ranges.

Specific examples of these oligoesters include (but are not limited to) oligoesters of fumaric acid-modified rosin with 1,4-butanediol, wherein $R_c$ is —$(CH_2)_4$—, oligoesters of fumaric acid-modified resin with 1,4-cyclohexanedimethanol, wherein $R_c$ is and the like, as well as mixtures thereof.

Additional examples include those formed from dimerized rosins, such as dimerized abietic acid, having two acid groups, with a diol, as follows:

-continued

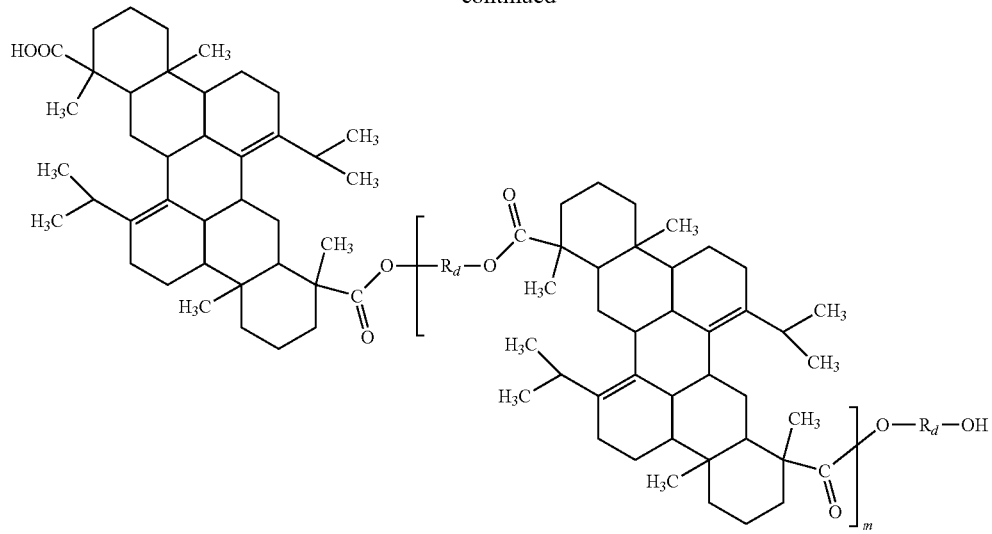

wherein $R_d$ is:

(i) alkylene, including linear, branched, saturated, unsaturated, cyclic, substituted, and unsubstituted alkylene, wherein hetero atoms, such as oxygen, nitrogen, sulfur, silicon, phosphorus, boron, and the like either may or may not be present in alkylene, in one embodiment with at least about 2 carbons, in another embodiment with at least about 4 carbons, and in yet another embodiment with at least about 6 carbons, and in one embodiment with no more than about 40 carbons, in another embodiment with no more than about 22 carbons, and in yet another embodiment with no more than about 12 carbons, although the number of carbons can be outside of these ranges;

(ii) arylene, including substituted and unsubstituted arylene, wherein hetero atoms, such as oxygen, nitrogen, sulfur, silicon, phosphorus, boron, and the like either may or may not be present in arylene, in one embodiment with at least about 6 carbons, in another embodiment with at least about 8 carbons, and in yet another embodiment with at least about 12 carbons, and in one embodiment with no more than about 40 carbons, in another embodiment with no more than about 22 carbons, and in yet another embodiment with no more than about 16 carbons, although the number of carbons can be outside of these ranges, such as phenylene or the like;

(iii) arylalkylene, including substituted and unsubstituted arylalkylene, wherein the alkyl portion of arylalkylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of arylalkylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as benzylene or the like; or (iv) alkylarylene, including substituted and unsubstituted alkylarylene, wherein the alkyl portion of alkylarylene can be linear, branched, saturated, unsaturated, and/or cyclic, wherein hetero atoms, such as oxygen, nitrogen, sulfur, silicon, phosphorus, boron, and the like either may or may not be present in either or both of the alkyl portion and the aryl portion of alkylarylene, in one embodiment with at least about 7 carbons, in another embodiment with at least about 8 carbons, and in yet another embodiment with at least about 10 carbons, and in one embodiment with no more than about 40 carbons, in another embodiment with no more than about 22 carbons, and in yet another embodiment with no more than about 16 carbons, although the number of carbons can be outside of these ranges, such as tolylene or the like; wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, and the like, wherein two or more substituents can be joined together to form a ring, and m is an integer representing the number of repeat monomer units, being in one embodiment at least about 1, and in another embodiment at least about 2, and in one embodiment no more than about 10, although the number can be outside of these ranges.

For example, when the diol is 1,4-cyclohexanedimethanol, $R_d$ is

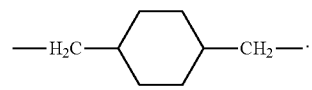

The oligoesters disclosed herein have weight average molecular weights (Mw) of in one embodiment at least about 600 g/mol, and in another embodiment at least about 800 g/mol, and in one embodiment no more than about 10,000 g/mol, and in another embodiment no more than about 2,000 g/mol, although the values can be outside of these ranges.

The oligoesters disclosed herein have polydispersity values of in one embodiment at least about 1, and in one embodiment no more than about 2, although the values can be outside of these ranges.

The compounds disclosed herein have glass transition temperatures (midpoint Tg) of in one embodiment at least about 1° C., and in another embodiment at least about 5° C., and in one embodiment no more than about 30° C., and in another embodiment no more than about 25° C., although the values can be outside of these ranges.

The glass transition temperatures of the materials disclosed herein can be determined by differential scanning calorimetry (DSC), with, for example, a TA Instruments Q100 apparatus, using a heating and cooling temperature gradient of 10° C. per minute and measuring the Tg after a second repeat cycle of heating and cooling (to remove thermal history of the sample).

The amorphous rosin-derived resin is present in the ink carrier in any desired or effective amount, in one embodiment at least about 5 percent by weight, and in another embodiment at least about 10 percent by weight, and in one embodiment no more than about 40 percent by weight, and in another embodiment no more than about 35 percent by weight, although the amount can be outside of these ranges.

Crystalline Component

The inks disclosed herein also contain, in addition to the amorphous rosin-derived resin, a crystalline component.

One example of a suitable crystalline component is a crystalline trans-cinnamic acid derived diester, as disclosed in, for example, U.S. application Ser. No. 13/095,784, filed Apr. 27, 2011, entitled "Solid Ink Compositions Comprising Amorphous Esters of Tartaric Acid," with the named inventors Kentaro Morimitsu, Jennifer L. Belelie, Naveen Chopra, Stephan V. Drappel, Corey Tracy, and Peter G. Odell, U.S. application Ser. No. 13/095,715, filed Apr. 27, 2011, entitled "Solid Ink Compositions Comprising Crystalline Esters of Tartaric Acid," with the named inventors Kentaro Morimitsu, Jennifer L. Belelie, Naveen Chopra, Stephan V. Drappel, Corey Tracy, and Peter G. Odell, and U.S. application Ser. No. 13/196,227, filed Aug. 2, 2011, entitled "Phase Change Inks Containing Crystalline Trans-Cinnamic Diesters and Amorphous Isosorbide Oligomers," with the named inventors Adela Goredema, Rina Carlini, Caroline M. Turek, Guerino G. Sacripante, and Edward G. Zwartz, the disclosures of each of which are totally incorporated herein by reference. Trans-cinnamic acid is a natural material found in oil of cinnamon, or in balsams such as storax or shea butter. Trans-cinnamic acid can also be derived from the natural amino-acid phenylalanine using the enzyme phenyalanine ammonia-lyase. Different diols of the formula HO—R—OH can be reacted with trans-cinnamic acid to give di-esters.

Examples of suitable trans-cinnamic diesters include (but are not limited to) those of the formula

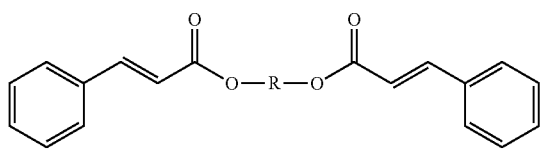

wherein R is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, or the like either may or may not be present in the alkylene group, in one embodiment with at least about 2 carbon atoms, in another embodiment with at least about 3 carbon atoms, and in yet another embodiment with at least about 4 carbon atoms, and in one embodiment with no more than about 20 carbon atoms, in another embodiment with no more than about 10 carbon atoms, and in yet another embodiment with no more than about 8 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, or the like either may or may not be present in the arylene group, in one embodiment with at least about 6 carbon atoms, in another embodiment with at least about 7 carbon atoms, and in yet another embodiment with at least about 8 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkylene group, in one embodiment with at least about 7 carbon atoms, in another embodiment with at least about 8 carbon atoms, and in yet another embodiment with at least about 9 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylarylene group, in one embodiment with at least about 7 carbon atoms, in another embodiment with at least about 8 carbon atoms, and in yet another embodiment with at least about 9 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and wherein the substituents on the substituents on the substituted alkylene, arylene, arylalkylene, and alkylarylene groups can be (but are not limited to) hydroxy groups, halogen atoms, ammonium groups, pyridine groups, pyridinium groups, ether groups, aldehyde groups, ketone groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, isothiocyanato groups, carboxylate groups, carboxylic acid groups, urethane groups, urea groups, mixtures thereof, or the like, wherein two or more substituents can be joined together to form a ring.

Specific examples of suitable trans-cinnamic acid derived diesters include (but are not limited to) propane-1,3-trans-cinnamate, of the formula

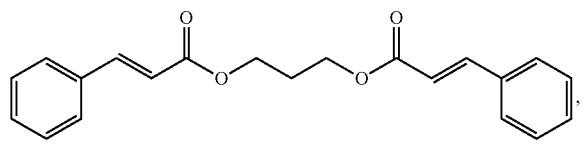 [SMILES: O=C(/C=C/c1ccccc1)OCCCOC(=O)/C=C/c1ccccc1]

butane-1,4-trans-cinnamate, of the formula

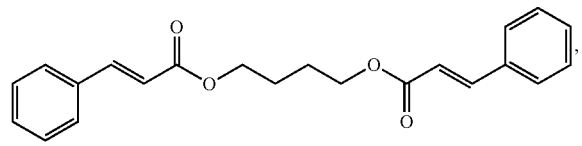 [SMILES: O=C(/C=C/c1ccccc1)OCCCCOC(=O)/C=C/c1ccccc1]

hexane-1,6-trans-cinnamate, of the formula

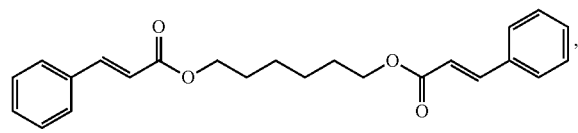 [SMILES: O=C(/C=C/c1ccccc1)OCCCCCCOC(=O)/C=C/c1ccccc1]

trans-cyclohexane-1,4-dimethanol-trans-cinnamate, of the formula

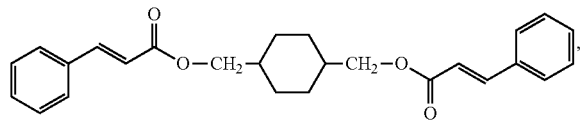 [SMILES: O=C(/C=C/c1ccccc1)OCC1CCC(COC(=O)/C=C/c2ccccc2)CC1]

para-phenyl-1,4-dimethanol-trans-cinnamate, of the formula

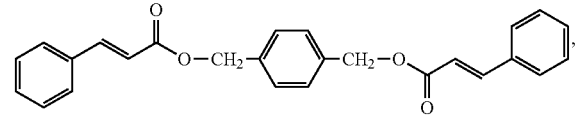 [SMILES: O=C(/C=C/c1ccccc1)OCc1ccc(COC(=O)/C=C/c2ccccc2)cc1]

bis(hydroxymethyl)furan-trans-cinnamate, of the formula

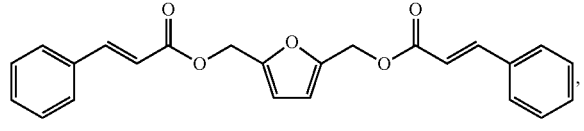 [SMILES: O=C(/C=C/c1ccccc1)OCc1ccc(COC(=O)/C=C/c2ccccc2)o1]

2,5-dihydroxymethyl-tetrahydrofuran-trans-cinnamate, of the formula

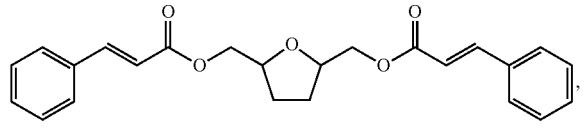 [SMILES: O=C(/C=C/c1ccccc1)OCC1CCC(COC(=O)/C=C/c2ccccc2)O1]

trans-cinnamic acid-2,3-butanediol diester, of the formula

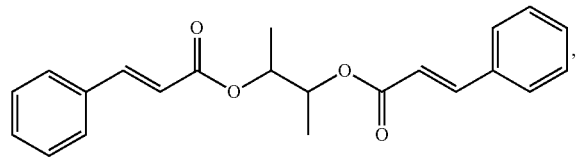 [SMILES: CC(OC(=O)/C=C/c1ccccc1)C(C)OC(=O)/C=C/c1ccccc1]

or the like, as well as mixtures thereof.

In one specific embodiment, the diol is selected to be derived from a bio-based or renewable resource. Products can be tested for whether they are sourced from petroleum or from renewable resources by $^{14}C$ radiocarbon dating. Products sourced from petroleum will have substantially high $^{14}C$ radiocarbon dating values, in the millions of years, compared to very recent or present day radiocarbon values for those products derived from renewable resources. Examples of suitable bio-based diols include, but are not limited to, 1,4-butanediol, 1,3-propadediol, 2,3-butanediol, or the like, as well as mixtures thereof, which can be obtained from sugars. In this manner, the entire trans-cinnamic diester material can be selected to be bio-based.

Another example of a suitable crystalline component is a crystalline diester of tartaric acid, as disclosed in, for example, U.S. application Ser. No. 13/095,715, filed Apr. 27, 2011, entitled "Solid Ink Compositions Comprising Crystalline Esters of Tartaric Acid," with the named inventors Kentaro Morimitsu, Jennifer L. Belelie, Naveen Chopra, Stephan V. Drappel, Corey Tracy, and Peter G. Odell, the disclosure of which is totally incorporated herein by reference. Specific examples of such materials include (but are not limited to) those of the formula

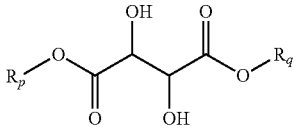

wherein $R_p$ and $R_q$ each, independently of the other, is:

(i) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group, in one embodiment with at least about 1 carbon atom, in another embodiment with at least about 4 carbon atoms, and in yet another embodiment with at least about 6 carbon atoms, and in one embodiment with no more than about 40 carbon atoms, in another embodiment with no more than about 22 carbon atoms, and in yet another embodiment with no more than about 12 carbon atoms, although the number of carbon atoms can be outside of these ranges;

(ii) an aryl group, including substituted and unsubstituted aryl groups, and wherein hetero atoms, such as oxygen, nitrogen, sulfur, silicon, phosphorus, boron, and the like either may or may not be present in the aryl group, in one embodiment with at least about 4 carbon atoms (in this instance at least one hetero atom would be present), in another embodiment with at least about 8 carbon atoms, and in yet another embodiment with at least about 12 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as phenyl or the like;

(iii) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as benzyl or the like; or (iv) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as tolyl or the like; wherein the substituents on the substituted alkyl, aryl, arylalkyl, and alkylaryl, groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, and the like, wherein two or more substituents can be joined together to form a ring. Depending on the R groups and the stereochemistries of the tartaric acid backbone, the esters can form crystals or amorphous compounds.

Specific examples of $R_p$ and $R_q$ include (but are not limited to):

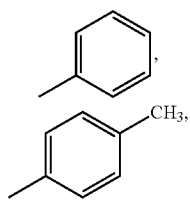

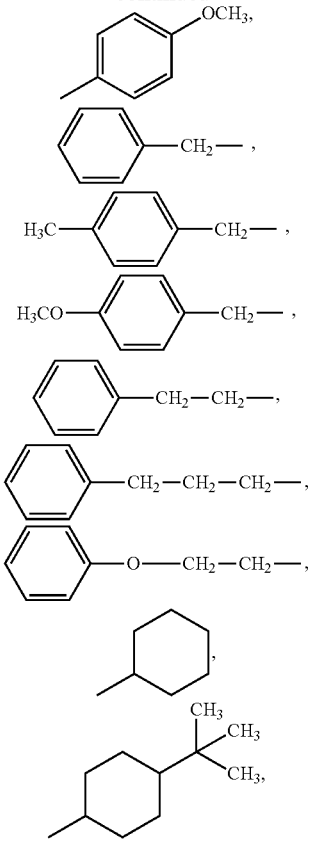

or the like, as well as mixtures thereof.

Some specific examples of suitable crystalline tartaric acid diesters include (but are not limited to) dibenzyl-L-tartrate, diphenethyl-L-tartrate, bis(3-phenyl-1-propyl)-L-tartrate, bis(2-phenoxyethyl)-L-tartrate, diphenyl-L-tartrate, bis(4-methylphenyl)-L-tartrate, bis(4-methoxyphenyl)-L-tartrate, bis(4-methylbenzyl-L-tartrate, bis(4-methoxybenzyl)-L-tartrate, dicyclohexyl-L-tartrate, bis(4-tert-butylcyclohexyl)-L-tartrate, or the like, as well as mixtures thereof.

Another example of a suitable crystalline component is a diurethane, such as those disclosed in U.S. application Ser. No. 13/456,619, filed Apr. 26, 2012, entitled, "Phase Change Ink Compositions Comprising Crystalline Diurethanes And Derivatives Thereof," with the named inventors Naveen Chopra, Jeffrey H. Banning, Jennifer L. Belelie, Gabriel Iftime, Kentaro Morimitsu, and Peter G. Odell, the disclosure of which is totally incorporated herein by reference. Examples of diurethanes include those of the formula

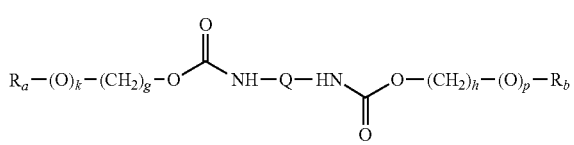

wherein:

(1) Q is an alkylene group, including linear, branched, saturated, unsaturated, cyclic, substituted, and unsubstituted alkylene groups, and wherein hetero atoms, such as oxygen, nitrogen, sulfur, silicon, phosphorus, boron, or the like either may or may not be present in the alkylene group, in one embodiment with at least about 2 carbon atoms, and in another embodiment with at least about 4 carbon atoms, and in one embodiment with no more than about 40 carbon atoms, and in another embodiment with no more than about 8 carbon atoms, although the number of carbon atoms can be outside of these ranges;

(2) g and h each, independently of the other, are integers representing the number of repeat —$CH_2$— groups, and are each, independently, from about 1 to about 4;

(3) k and p each, independently of the other, are integers representing the number of oxygen atoms, and are each, independently of the other, 0 or 1;

(4) $R_a$ and $R_b$ each, independently of the other, are:
  (a) a cyclic alkyl group, including substituted cyclic alkyl groups, and wherein hetero atoms, such as oxygen, nitrogen, sulfur, silicon, phosphorus, boron, or the like either may or may not be present in the cyclic alkyl group, in one embodiment with about 6 carbon atoms, such as cyclohexyl or the like;
  (b) an aryl group, including substituted and unsubstituted aryl groups, and wherein hetero atoms, such as oxygen, nitrogen, sulfur, silicon, phosphorus, boron, and the like either may or may not be present in the aryl group, in one embodiment with about 6 carbon atoms, such as phenyl or the like;
  (c) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group, in one embodiment with at least about 7 carbon atoms, and in one embodiment with no more than about 50 carbon atoms, in another embodiment with no more than about 20 carbon atoms, in yet another embodiment with no more than about 14 carbon atoms, and in still another embodiment with no more than about 10 carbon atoms, such as benzyl or the like; or
  (d) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group, in one embodiment with at least about 7 carbon atoms, and in one embodiment with no more than about 50 carbon atoms, in another embodiment with no more than about 20 carbon atoms, in yet another embodiment with no more than about 14 carbon atoms, and in still another embodiment with no more than about 10 carbon atoms, such as benzyl or the like;

wherein the substituents on the substituted alkyl, aryl, arylalkyl, and alkylaryl, groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, and the like, wherein two or more substituents can be joined together to form a ring.

In a specific embodiment, the diurethane is of the formula

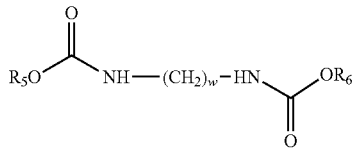

wherein:
  w is an integer representing the number of repeat —$CH_2$— units, and is in one embodiment from about 4 to about 8; and
  $R_5$ and $R_6$ each, independently of the other, are benzyl, 2-phenylethyl, 2-phenoxyethyl, $C_6H_5(CH_2)_4$—, cyclohexyl, 2-methylcyclohexyl, 3-methylcyclohexyl, 4-methylcyclohexyl, 3-phenylpropanyl, cyclohexylmethyl, 2-methylcyclohexylmethyl, 3-methylcyclohexylmethyl, 4-methylcyclohexylmethyl, 4-ethylcyclohexyl, or the like.

In a more specific embodiment, the diurethane is of the formula

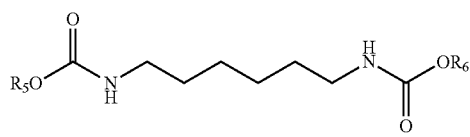

wherein $R_5$ and $R_6$ each, independently of the other, are as defined above.

The crystalline component is present in the ink carrier in any desired or effective amount, in one embodiment at least about 60 percent by weight, in another embodiment at least about 65 percent by weight, and in yet another embodiment at least about 70 percent by weight, and in one embodiment no more than about 95 percent by weight, in another embodiment no more than about 90 percent by weight, and in yet another embodiment no more than about 85 percent by weight, although the amount can be outside of these ranges.

Colorants

The ink compositions can also contain an optional colorant Any desired or effective colorant can be employed in the ink compositions, including dyes, pigments, mixtures thereof, or the like. Any dye or pigment can be chosen, provided that it is capable of being dispersed or dissolved in the ink carrier and is compatible with the other ink components. The ink compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, or the like. Examples of suitable dyes include Neozapon Red 492 (BASF); Orasol Red G (BASF); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (BASF); Orasol Black CN (BASF); Savinyl Black RLSN(Clariant); Pyrazol Black BG (Clariant); Morfast Black 101 (Rohm & Haas); Diazol Black RN (ICI); Orasol Blue GN (BASF); Savinyl Blue GLS (Clariant); Luxol Fast Blue MBSN (Pylam Products); Sevron Blue 5GMF (Classic Dyestuffs); Solvent Blue 36 (a substituted aminoanthraquinone dye available from Aakash Dyes and Chemicals); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, or the like. Other suitable dyes include those disclosed in U.S. Patent Application Publication No. 2010/0086683 and U.S. Pat. Nos. 7,732,581; 7,381,831; 6,713,614; 6,646,111; 6,590,082; 6,472,523; 6,713,614; 6,958,406; 6,998,493; 7,211,131; and 7,294,730, the disclosures of each of which are totally incorporated herein by reference. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

In some embodiments, solvent dyes are employed. Examples of suitable solvent dyes include Neozapon Red 492 (BASF); Orasol Red G (BASF); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (BASF); Orasol Black RLP (BASF); Savinyl Black RLS (Clariant); Morfast Black Conc. A (Rohm and Haas); Orasol Blue GN (BASF); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), or the like.

Pigments are also suitable colorants for the inks described herein. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (Du Pont); PALIOGEN Black L0084 (BASF); Pigment Black K801 (BASF); and carbon blacks such as REGAL 330™ (Cabot), Nipex 150 (Degussa) Carbon Black 5250 and Carbon Black 5750 (Columbia Chemical), or the like. Other suitable pigments include those disclosed in U.S. Pat. Nos. 7,905,954; 7,503,973; 7,465,348; and 7,427,323, the disclosures of each of which are totally incorporated herein by reference.

Other ink colors besides the subtractive primary colors can be desirable for applications such as postal marking, industrial marking, and labelling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

Mixtures of two or more dyes, two or more pigments, and one or more dyes with one or more pigments can also be used.

The ink can also contain one or more dispersants and/or one or more surfactants for their known properties, such as for controlling wetting properties of the pigments in the ink composition. Examples of suitable additives include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); Foam Blast 20F, 30, 550 (Lubrizol); EFKA-1101, -4046, -4047, -2025, -2035, -2040, -2021, -3600, -3232; SOLSPERSE 13000, 13240, 17000, 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, 182 (BYK-Chemie); K-SPERSE 132, XD-A503, XD-A505 (King Industries). When present, the optional additives may each, or in combination, be present in the ink in any desired or effective amount, in one embodiment at least about 0.1 percent by weight of the ink, and in another embodiment at least about 0.5 percent by weight of the ink, and in one embodiment no more than about 15 percent by weight of the ink, and in another embodiment no more than about 12 percent by weight of the ink, although the amount can be outside of these ranges.

The colorant is present in any desired or effective amount to obtain the desired color or hue, in one embodiment at least about 0.5 percent by weight of the ink, in another embodiment at least about 1 percent by weight of the ink, and in yet another embodiment at least about 2 percent by weight of the ink, and in one embodiment no more than about 30 percent by weight of the ink, in another embodiment no more than about 20 percent by weight of the ink, in yet another embodiment no more than about 15 percent by weight of the ink, in still another embodiment no more than about 12 percent by weight of the ink, and in yet another embodiment no more than about 10 percent by weight of the ink, although the amount can be outside of these ranges.

Additional Ink Additives

Additional optional components can be contained in the ink, such as viscosity modifiers, which are suitably low-melting and preferably crystalline compounds that have low melt viscosities so as to enable the phase change ink to have a low viscosity for inkjet printing. Crystalline viscosity modifiers can have melting temperatures of in one embodiment at least about 40° C., in another embodiment at least about 50° C., and in yet another embodiment at least about 55° C., and in one embodiment no more than about 100° C., in another embodiment no more than about 95° C., and in yet another embodiment no more than about 90° C., although the temperature can be outside of these ranges. The melt viscosities of suitable viscosity modifiers for use in the inks disclosed herein are in one embodiment at least about 3cPs, in another embodiment at least about 4cPs, and in yet another embodiment at least about 5 cPs, and in one embodiment no more than about 12 cPs, in another embodiment no more than about 10 cPs, and in yet another embodiment no more than about 9.5 cPs, although the value can be outside of these ranges. Examples of suitable viscosity modifiers for the phase change ink include, but are not limited to, pentaerythritol esters, such as pentaerythritol tetrastearate, pentaerythritol tetrabenzoate, or the like, sorbitol esters, including sorbitan tristearate esters or the like, such as SPAN 65, SPAN 60, SPAN 85, SPAN 40, or the like, available from Sigma-Aldrich Fine Chemicals Inc., Milwaukee, Wis., stearyl stearamide (also known as KEMAMIDE S180 available from Chemtura Corp., USA), erucamide, stearone, sucrose tetrastearate, sucrose tetrastearate triacetate (commercially available as SISTERNA A10E-C), linear alkyl cinnamate esters, esters of the general formula

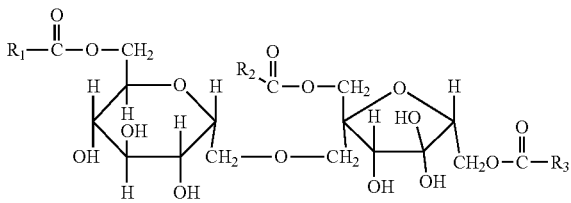

wherein $R_1$, $R_2$, and $R_3$ each, independently of the others, are hydrogen atoms or alkyl chains derived from saturated fatty acids (such as palmitic acid or the like), hexadecanamide, octadecanamide, erucamide, stearyl stearamide, or the like, as well as mixtures thereof, in the ink composition in amounts of in one embodiment at least about 0.5 percent by weight, in another embodiment at least about 1 percent by weight, and in yet another embodiment at least about 2 percent by weight, and in one embodiment no more than about 15 percent by weight, in another embodiment no more than about 12 percent by weight, and in yet another embodiment no more than about 10 percent by weight, although the amount can be outside of these ranges.

In some embodiments, the ink can optionally contain antioxidants to protect the images from oxidation and also to protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy)) ethoxyphenyl)propane (TOPANOL-205, available from ICI America Corporation), (3) tris(4-tert-butyl-3-hydroxy-2,6-dimethyl benzyl)isocyanurate (CYANOX 1790, 41,322-4, LTDP, Aldrich D12, 840-6), (4) 2,2'-ethylidene bis(4,6-di-tert-butylphenyl)fluorophosphonite (ETHANOX-398, available from Ethyl Corporation), (5) tetrakis(2,4-di-tert-butylphenyl)-4,4'-biphenyl diphosphonite (Aldrich 46, 852-5), (6) pentaerythritol tetrastearate (TCI America #PO739), (7) tributylammonium hypophosphite (Aldrich 42, 009-3), (8) 2,6-di-tert-butyl-4-methoxyphenol (Aldrich 25, 106-2), (9) 2,4-di-tert-butyl-6-(4-methoxybenzyl)phenol (Aldrich 23, 008-1), (10) 4-bromo-2,6-dimethylphenol (Aldrich 34, 951-8), (11) 4-bromo-3,5-didimethylphenol (Aldrich B6, 420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich D14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4, 680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26, 003-7), (21) α,α,α-trifluoro-o-cresol (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Aldrich 29, 043-2), (26) 3-fluorophenylacetic acid (Aldrich 24, 804-5), (27) 3,5-difluoro phenylacetic acid (Aldrich 29, 044-0), (28) 2-fluorophenylacetic acid (Aldrich 20, 894-9), (29) 2,5-bis(trifluoromethyl)benzoic acid (Aldrich 32, 527-9), (30) ethyl-2-(4-(4-(trifluoromethyl)phenoxy)phenoxy) propionate (Aldrich 25, 074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43, 071-4), NAUGARD 76, NAUGARD 445, NAUGARD 512, and NAUGARD 524 (manufactured by Chemtura Corporation), or the like, as well as mixtures thereof. The antioxidant, when present, can be present in the ink in any desired or effective amount, in one embodiment at least about 0.25 percent by weight of the ink, and in another embodiment at least about 1 percent by weight of the ink, and in one embodiment no more than about 10 percent by weight of the ink, and in another embodiment no more than about 5 percent by weight of the ink, although the amount can be outside of these ranges.

The term "ink carrier", as used herein, refers to those components of the ink other than the colorant or mixture of colorants.

Ink Preparation

The ink compositions can be prepared by any desired or suitable method. For example, each of the components of the ink carrier can be mixed together, followed by heating the mixture to at least its melting point. The colorant may be added before the ink ingredients have been heated or after the ink ingredients have been heated. The molten mixture may optionally be subjected to grinding in an attritor, ball mill or media mill apparatus, or to high shear mixing, in order to effect dispersion of the colorant in the ink carrier. The heated mixture is then stirred to obtain a uniform molten ink, followed by cooling the ink to ambient temperature. The inks are solid at ambient temperature.

Ink Properties

The melting and crystallization temperatures of the phase change ink compositions can be determined by differential scanning calorimetry (DSC), with, for example, a TA Instruments Q100 apparatus, using a heating and cooling temperature gradient of 10° C. per minute and measuring the crystallization temperature after a second repeat cycle of heating and cooling (to remove thermal history of the sample). The melting and crystallization temperatures of the phase change ink compositions can also be determined by dynamic rheology (with, for example, a Rheometrics RFS3 strain-controlled rheometer, using a 25 mm parallel plate geometry tool), gap=0.2 mm, temperature sweep at 2° C. per minute, while cooling the ink sample from an initial high temperature, such as about 140° C., to about 40° C., under a constant oscillating frequency of about 1 Hz and applied strain of about 200%.

The ink compositions in one embodiment have peak melting points, as measured by DSC methods, of in one embodiment no lower than about 60° C., and in another embodiment no lower than about 70° C., and have melting points of in one embodiment no higher than about 150° C., and in another embodiment no higher than about 125° C., although the peak melting point can be outside of these ranges.

The ink compositions in one embodiment have onset crystallization temperatures, as measured by the dynamic rheology method, of in one embodiment no lower than about 60° C., and in another embodiment of no lower than about 65° C., and have onset crystallization temperatures of in one embodiment no higher than about 120° C., and in another embodiment no higher than about 110° C., although the onset crystallization temperature can be outside of these ranges.

The ink compositions generally have melt viscosities at a suitable jetting temperature (in one embodiment no lower than about 90° C., in another embodiment no lower than about 95° C., and in yet another embodiment no lower than about 100° C., and in one embodiment no higher than about 150° C., and in another embodiment no higher than about 140° C., although the jetting temperature can be outside of these ranges) in one embodiment of no more than about 22 cps (centipoise), in another embodiment of no more than about 18 cps, and in yet another embodiment of no more than about 15 cps, and in one embodiment of no less than about 5 cps at 130° C., although the viscosity can be outside of these ranges.

The phase change ink compositions generally have peak viscosities at the end of their crystallization (solidification) phase transition (in one embodiment no lower than about 40° C., in another embodiment no lower than about 50° C., and in yet another embodiment no lower than about 60° C., and in one embodiment no higher than about 120° C., and in another embodiment no higher than about 110° C., although the solidification endpoint temperature can be outside of these ranges) in one embodiment of no less than about $1 \times 10^6$ cps at 50° C.

The hardness of the phase change ink is a characteristic that can serve as an indicator of ink robustness on the printed image (for example, resistance to abrasion, folding creases, or the like). The ink hardness can be measured using a needle penetrometer apparatus, such as the PTC® Durometer Model PS 6400-O-29001 (available from Pacific Transducer Corp., USA) equipped with a Model 476 Stand with standard 1 Kg load. In this Durometer apparatus, a sharp tip (or needle) mounted within a retractable post is pressed against the surface of a molded sample of ink. The degree of resistance to the needle tip upon pushing down on the ink surface is measured and correlated to the distance by which the needle tip has retracted backward into the mounting post. A measured value of 100 would indicate a perfectly hard and impermeable surface (such as glass).

The inks disclosed herein have hardness values, measured at about 25° C. using the PTC® Durometer of 5 g samples set in brass molds, of in one embodiment at least about 70, and in another embodiment at least about 75, although the value can be outside of these ranges.

Biorenewable content (% BRC) is defined as the total weight percent of biorenewable ink raw materials out of total mass of raw materials in an ink composition. The inks disclosed herein have a % BRC of in one embodiment at least about 25, in another embodiment at least about 30, and in yet another embodiment at least about 35, although the value can be outside of these ranges.

Printing Processes

The inks can be employed in an apparatus for ink jet printing processes either directly to paper, or indirectly to an intermediate transfer member. Examples of apparatus that are suitable for printing the inks described herein include apparatus comprising at least one thermally controlled ink retaining reservoir to store or hold molten phase-change ink, an ink jet head for printing the ink, and an ink supply line for providing the phase-change ink to the ink jet head.

Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. Known direct printing process may be suitable for applying the ink compositions of the present disclosure onto a substrate.

Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, or the like. Phase-change inks as disclosed herein can also be used in printing processes other than hot melt ink jet printing processes, such as hot-melt lithographic, flexographic, and related offset ink printing processes.

Any suitable substrate or recording sheet can be employed, such as plain paper, including XEROX® 4024 papers, XEROX® Image Series papers, Courtland 4024 DP paper, ruled notebook paper, bond paper, coated papers such as Sharp Company silica coated paper, Xerox® Digital Color Elite Gloss paper, JuJo paper, HAMMERMILL LASERPRINT® paper, heavy paper stocks or the like, and transparency materials, fabrics, textile products, plastics, flexible polymeric films, inorganic substrates such as metals or silicon wafers, wood, or the like.

Specific embodiments will now be described in detail. These examples are intended to be illustrative, and the claims are not limited to the materials, conditions, or process parameters set forth in these embodiments. All parts and percentages are by weight unless otherwise indicated.

Example I

Synthesis of Fumaric Acid-Modified Rosin/Butanediol Oligoester A

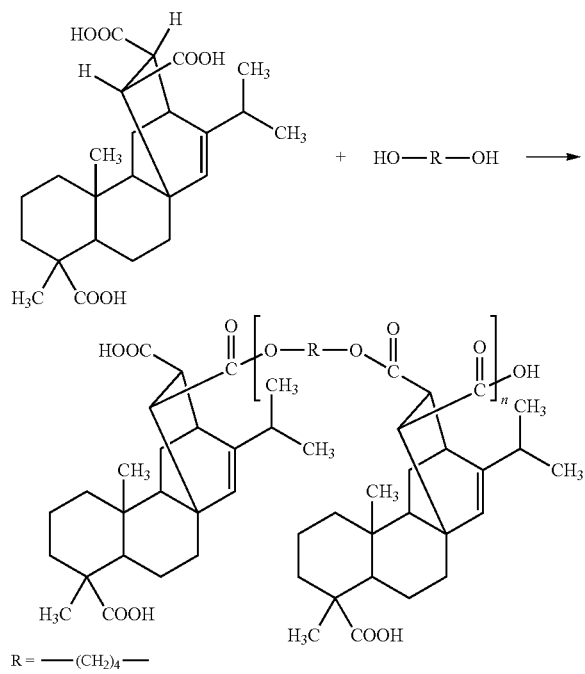

R = —(CH$_2$)$_4$—

In a 200 mL round-bottom flask equipped with a water condenser was charged fumaric-modified rosin acid (obtained from HARIMA; 10.0 g, 24 mmol), 1,4-butanediol (1.44 g, 15.95 mmol; obtained from Aldrich), para-toluenesulfonic acid as catalyst (0.028 g, 0.160 mmol), and toluene as solvent (30 mL). The light amber solution that resulted was stirred magnetically and gradually heated to reflux temperature (internal temperature 115° C.) under argon atmosphere for a total of 10 h. Initially, the reaction mixture became quite viscous and gelled slightly in the solvent (attributed to self-association of the carboxylic acid groups in a hydrocarbon solvent), but as conversion to the oligoester proceeded, the viscosity of the solution diminished greatly and the color darkened. After the reaction was complete, the solvent was removed in vacuo, after which the mixture was diluted with more toluene (150 mL) and washed with 3×150 mL portions of deionized water and 1×50 mL portion of brine solution (saturated NaCl in water). The organic layer was dried with anhydrous Na$_2$SO$_4$ crystals and then filtered and concentrated under vacuum to give 10.50 g of a light amber semi-solid tacky material. MALDI-mass spectral analysis of this resin revealed molecular weight data of Mn=837, Mw=884, and polydispersity index PDI of 1.06. The average molecular weight was 890, Tg as measured by DSC was 17.2° C., the viscosity at 130° C. was 2440 centipoise, the viscosity at 140° C. was 4150 centipoise, the viscosity at 70° C. was >1×10$^6$ centipoise, and the % BRC (amount of biorenewable content in the composition) was 100.

Example II

Synthesis of Fumaric Acid-Modified Rosin/Butanediol Oligoester B

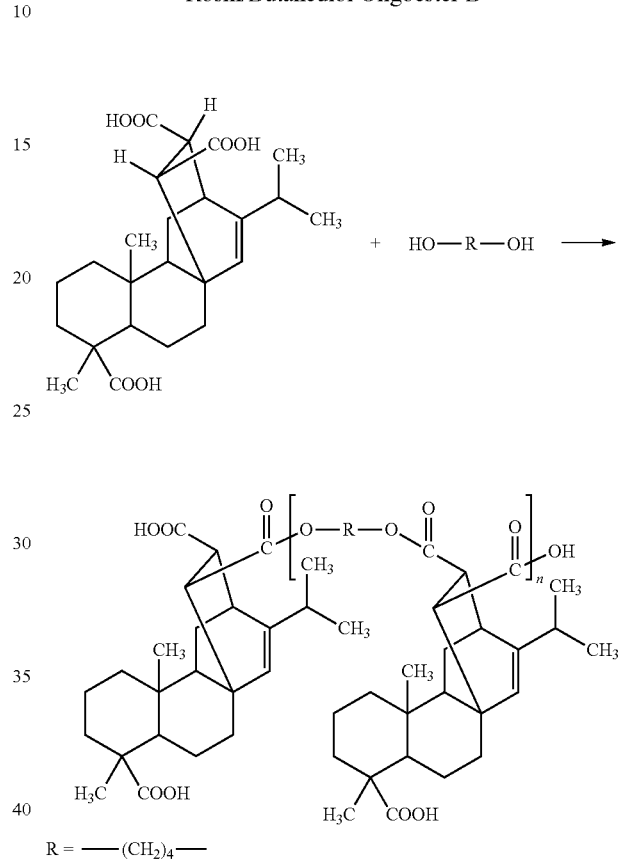

R = —(CH$_2$)$_4$—

In a 200 mL round-bottom flask equipped with a water condenser was charged fumaric-modified rosin acid (obtained from HARIMA; 10.0 g, 24 mmol), 1,4-butanediol (1.56 g, 17.31 mmol; obtained from Aldrich), para-toluenesulfonic acid as catalyst (0.028 g, 0.160 mmol), and toluene as solvent (50 mL). The light amber solution that resulted was stirred magnetically and gradually heated to reflux temperature (internal temperature 115° C.) under argon atmosphere for a total of 8 h. Initially, the reaction mixture became quite viscous and gelled slightly in the solvent, but as conversion to the oligoester proceeded, the viscosity of the solution diminished greatly and the color darkened. After the reaction was complete, the solvent was removed in vacuo, after which the mixture was diluted with more toluene (200 mL) and washed with 1×50 mL portion of deionized water and 1×50 mL portion of brine solution. The organic layer was dried with anhydrous Na$_2$SO$_4$ crystals and then filtered and concentrated under vacuum to give 8.67 g of a light amber semi-solid tacky material. The viscosity at 130° C. was 1834 centipoise, the viscosity at 70° C. was 9.4×10$^7$ centipoise, and the % BRC (amount of biorenewable content in the composition) was 100.

Example III

Synthesis of Dimerized Rosin/Cyclohexanedimethanol Oligoester

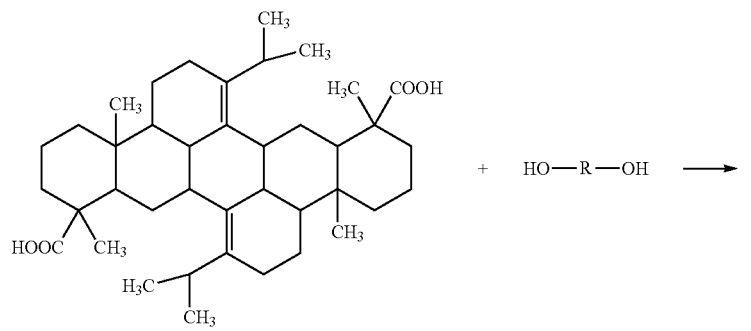

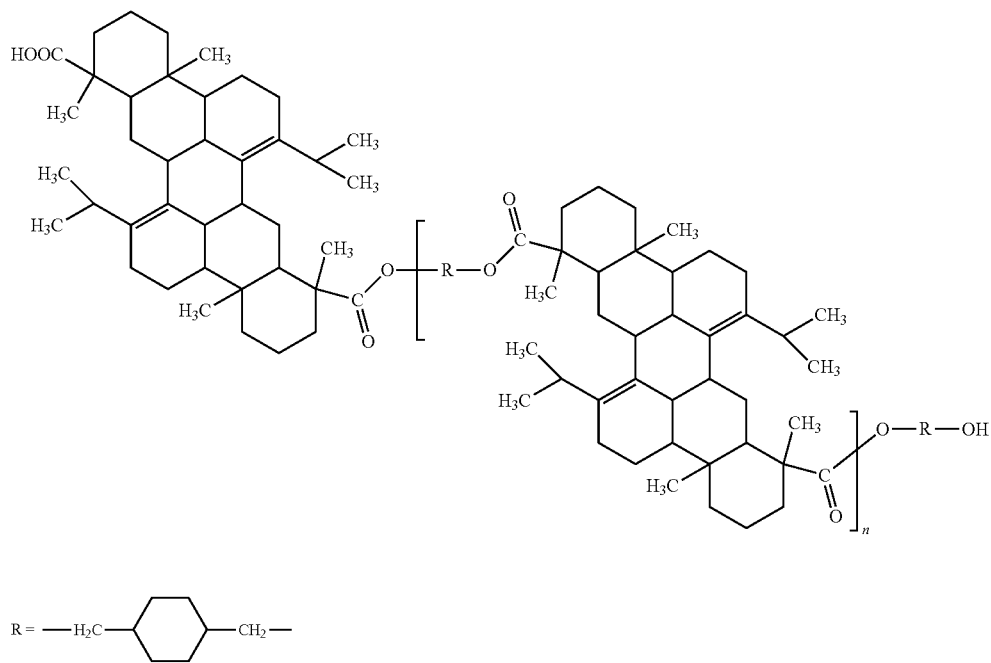

R = —H₂C—⟨cyclohexane⟩—CH₂—

In a 200 mL round-bottom flask equipped with a water condenser was charged DYMEREX (5.00 g, 8.27 mmol; dimerized abietic acid, obtained from Eastman), 1,4-cyclohexanedimethanol (2.147 g, 14.9 mmol; obtained from Aldrich), para-toluenesulfonic acid as catalyst (0.014 g, 0.083 mmol), and toluene solvent (30 mL). The light amber solution that resulted was stirred magnetically and gradually heated to reflux temperature (internal temperature 115° C.) under argon atmosphere for a total of 10 h. As reaction conversion to the oligoester proceeded, the viscosity of the solution increased and color darkened. After the reaction was complete, the solvent was removed in vacuo, after which the mixture diluted with more toluene (150 mL) and washed with 3×150 mL portions of deionized water and 1×50 mL portion of brine solution. The organic layer was dried with anhydrous $Na_2SO_4$ crystals and then filtered and concentrated under vacuum to give 6.27 g of a tan solid material. Tg as measured by DSC was 15.3° C., the viscosity at 140° C. was 3660 centipoise, the viscosity at 70° C. was >1×10$^7$ centipoise, and the % BRC (amount of biorenewable content in the composition) was 100.

Example IV

Synthesis of Butane-1,4-Trans-Cinnamate

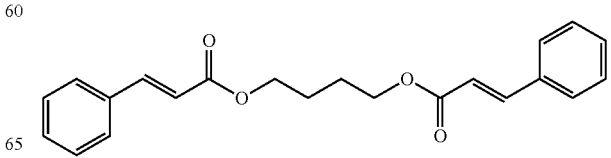

To a 3-neck 500 mL round-bottomed flask equipped with a Dean-Stark trap, condenser, thermocouple, and argon inlet was added trans-cinnamic acid (100 g, 674 mmol, obtained from Sigma-Aldrich), 1,4-butanediol (30.4 g, 337 mmol, obtained from Sigma-Aldrich) and FASCAT 4201 (0.12 g, 0.1 wt %, obtained from Arkema Inc). The mixture was slowly heated under argon to 120° C., during which the trans-cinnamic acid melted. The temperature was raised to 180° C., and condensation began around 150° C. The reaction mixture was stirred at 180° C. overnight (~20 hours). Thereafter, vacuum (1-2 mm-Hg) was applied for 20 minutes. A total of 5.3 mL of water was collected in the dean stark trap. The reaction was cooled under argon to 100° C. and discharged into an aluminum tray and cooled to room temperature to give 110 g of product as an off-white solid. The product was transferred to a 500 mL Erlenmeyer flask, to which was added 125 mL isopropanol, and the mixture was heated to 85° C., during which the product dissolved. The mixture was then cooled to room temperature, during which product crystallized out. The product was filtered and dried in a vacuum oven at 60° C. overnight to give 90 g product as an off-white solid (79% yield). The product was shown to be pure by NMR and had a melting temperature as measured by DSC of 93° C., a crystallization temperature as measured by DSC of 72° C., a crystallization temperature as measured by rheology techniques of 86° C., a viscosity at 130° C. of 4.85 centipoise, a viscosity at room temperature of $>7\times10^7$ centipoise, and a % BRC of 25%.

down to room temperature and washed with $NaHCO_3$ aq. (2×) and brine (1×) and then dried over $MgSO_4$. After filtration and removal of the solvent, the residue was recrystallized from toluene to obtain 16.9 g (yield: 79%) of white crystals. The sample was characterized by $^1H$ NMR and acid number analysis (4.06 mgKOH/g), a melting temperature as measured by DSC of 110° C., a crystallization temperature as measured by DSC of 83° C., a crystallization temperature as measured by rheology techniques of 110° C., a viscosity at 130° C. of 4.7 centipoise, a viscosity at room temperature of $>10^6$ centipoise, and a % BRC of 41%.

Preparation of Inks 1 Through 4

Inks were formulated at 5 or 10 gram scale using the weight percentage proportions of the components listed in the table below. Ink Example 1 gives a typical procedure for ink making. Into a 30 mL glass vessel was charged, in the following order: 3.73 g butane-1,4-trans-cinnamate (74.5 wt %), 1.0 g fumaric acid-modified rosin/butanediol oligoester (20 wt %), and 0.15 g sorbitan tristearate ester (SPAN 65, obtained from Aldrich) as compatibilizer additive (3 wt %). The materials were melted at 130° C. for 1 h, after which was added 0.13 g Orasol Blue GN dye (2.50 wt % colorant, obtained from CIBA) to the molten mixture. The colored ink mixture was then heated at 130° C. while stirring at 350 rpm for an additional 2 h. The dark blue molten ink was then poured into a brass disk mold and cooled at room temperature to solidify.

| Ink Component | Ink 1 | Ink 2 | Ink 3 | Ink 4 |
|---|---|---|---|---|
| butane-1,4-trans-cinnamate (% BRC 25) | 74.5 | 74.5 | 74.5 | 0 |
| di-phenylethyl-(L)-tartrate (% BRC 41) | 0 | 0 | 0 | 74.5 |
| fumaric acid-modified rosin/butanediol oligoester A (% BRC 100) | 0 | 20 | 20 | 0 |
| fumaric acid-modified rosin/butanediol oligoester B (% BRC 100) | 0 | 0 | 0 | 20 |
| dimerized rosin/cyclohexanedimethanol oligoester (% BRC >90) | 20 | 0 | 0 | 0 |
| sorbitan tristearate ester (% BRC 100) | 3 | 3 | 3 | 3 |
| Orasol Blue GN dye | 2.5 | 2.5 | 2.5 | 2.5 |
| viscosity at 130° C. (centipoise) | 9.3 | 11.7 | 11.2 | 12.3 |
| viscosity at 50° C. (centipoise) | $>2 \times 10^7$ | $>4 \times 10^7$ | $1.3 \times 10^7$ | $2.0 \times 10^7$ |
| onset of crystallization (° C., rheology) | 65 | 67 | 61.5 | 95.5 |
| onset of crystallization (° C., DSC) | — | — | — | 57.5 |
| average durometer hardness | 84 | 79 | 82 | 75 |
| ink % BRC (as wt. % bio-based materials) | 39.6 | 41.6 | 41.6 | 53.5 |
| physical observations | none | none | odor | none |

— = not measured

Example V

Synthesis of Di-Phenylethyl-(L)-Tartrate

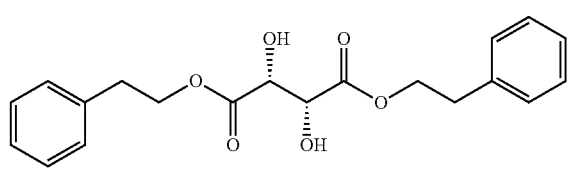 [SMILES: O=C(OCCc1ccccc1)[C@H](O)[C@@H](O)C(=O)OCCc1ccccc1]

In a 500 mL flask equipped with a Dean-Stark trap, L-tartaric acid (9.0 g, 60 mmol), phenethyl alcohol (22.0 g, 180 mmol), and toluene (120 mL) were added to give a suspension. p-Toluenesulfonic acid monohydrate (0.14 g, 0.75 mmol) was added and the mixture was refluxed for 17 h with azeotropic removal of water. The reaction mixture was cooled Test methods for viscosity, crystallization onset temperature measurements by DSC and rheology, peak Tmelt, and hardness were as described hereinabove with respect to ink characteristics.

Ink Rheology

Inks 1 through 4 had melt viscosities at temperatures above 130° C. in the range of 9-12cPs, which is appropriately suited for piezoelectric inkjet printing. At temperatures lower than about 60° C., the ink viscosities were all greater than about $1\times10^4$cPs, and at temperatures lower than about 50° C., all of the inks were fully solidified, with viscosities great than about $1\times10^7$cPs. Rheology profiles for the inks are shown in FIG. 1, showing complex viscosity versus temperature.

Scratch Testing

Inks 1 through 4 were printed onto Xerox Digital Color Elite Gloss coated papers (120 gsm stock) using a K-proofer gravure printing plate rigged with a pressure roll set at low pressure. The gravure plate temperature controller was set at 142° C., but the actual plate temperature was ~134° C. Image robustness of the K-proofed ink print was evaluated using a "coin" scratch test. The test looked at how much ink was removed from the coating after a "coin" tool with a beveled edge was run across the surface. For this test a modified Taber Industries Linear Abraser (Model 5700) with a custom "coin" scratch tip was used. The scratch attachment (mass of the "coin" holder, scratch tip, mounting) was 100 g and was lowered onto the test sample, which was then scratched for either 3 cycles or 9 cycles with a frequency of 25 cycles/minute. A two inch long scratch was examined to see what damage had occurred to the print. The amount of material removed from the coated paper was then measured by first scanning along the scratch length using a flat bed scanner. Commercial image analysis software converted the pixel count to a unit-less measurement CA (crease area). White areas in the scratch zone (i.e. areas where ink had been removed from the substrate by the scratch tip) were counted. Higher pixel counts corresponded to more ink being removed from the print and showing more damage. A perfect non-scratched ink print had no material being removed and therefore had very low pixel count (and CA) approaching zero.

Figure 2:
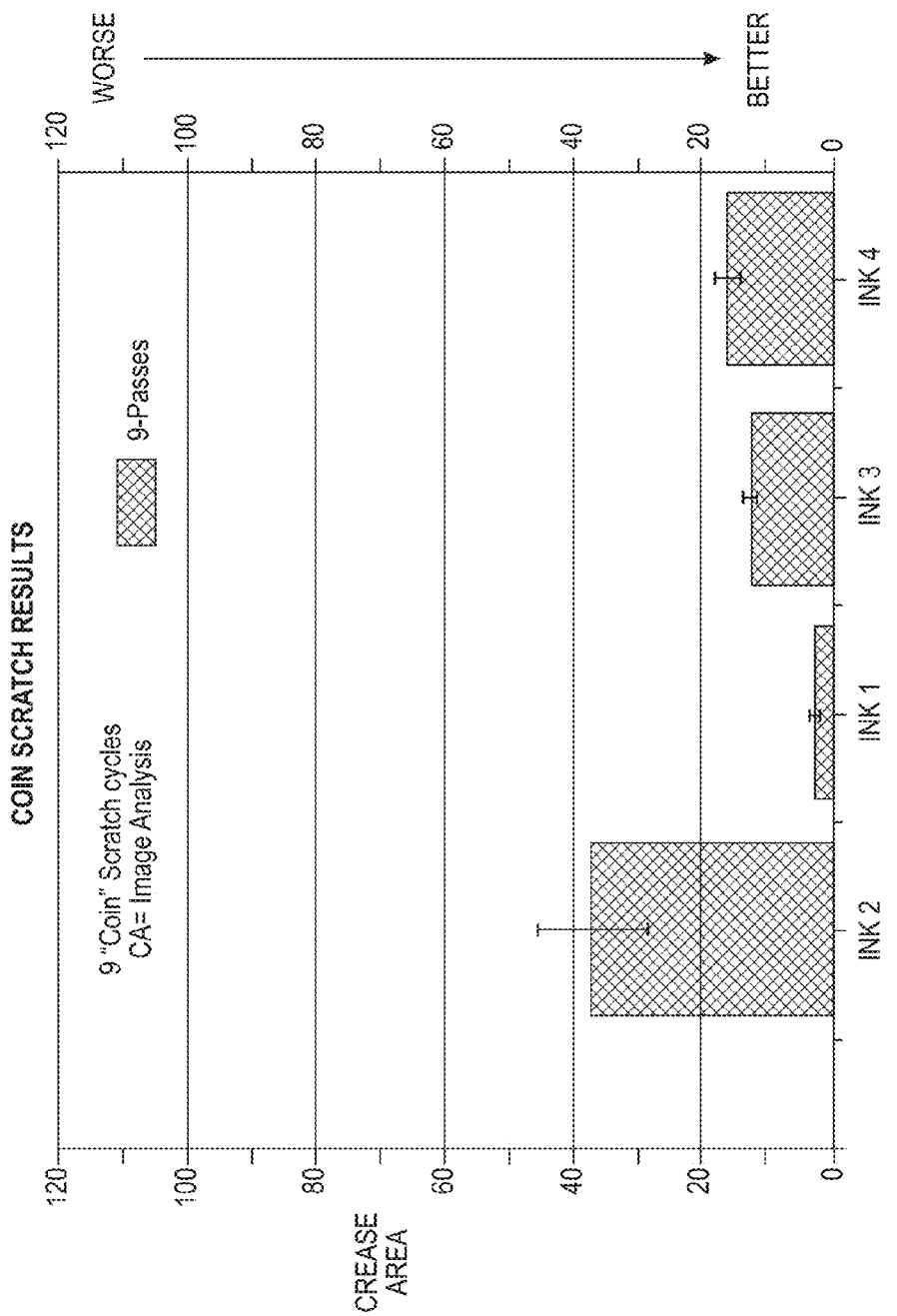
FIG. 2 is a plot of scratch resistance performance for inks as disclosed herein.

FIG. 2 shows the plots of crease area (measured by image analysis software) of the scratch tested prints. For comparison purposes, a high quality commercially available ink was also printed and tested under the same conditions. As the results indicate, all of the Example inks exhibited much better resistance to scratch testing compared to the commercial ink, in the range from about 2.5× to about 15× improvement (based on image analysis of crease area where ink was removed). In some examples, the coin-scratch performance was remarkably improved by a factor of 5× or higher compared to the commercial ink print.

Another scratch test tool is called the gouge finger tester, which is a custom apparatus equipped with three separate sharp finger-like tips that are dragged across the ink print sample. Different force loads are applied to the three fingers, labelled as heavy, medium, and light force loads. The prints prepared with the inks of the Examples were scratch-tested using only the medium and heavy load gouge finger tools, as these are considered stress test conditions. For each gouge finger tip, a single scratch that runs down the length of the print sample was conducted at constant speed setting. The scratched area of the print sample was then examined to characterize the amount of ink or toner material removed from the print sample in the same manner as done for the coin scratch tester described above. Commercial image analysis software converted the pixel count to a unit-less measurement CA (crease area). White areas in the scratch zone (i.e. areas where ink has been removed from the substrate by the scratch tip) were counted. Higher pixel counts corresponded to more ink being removed from the print and showing more damage. A perfect non-scratched ink print would have no material being removed and therefore would have very low pixel count (and CA) approaching zero.

Figure 3:
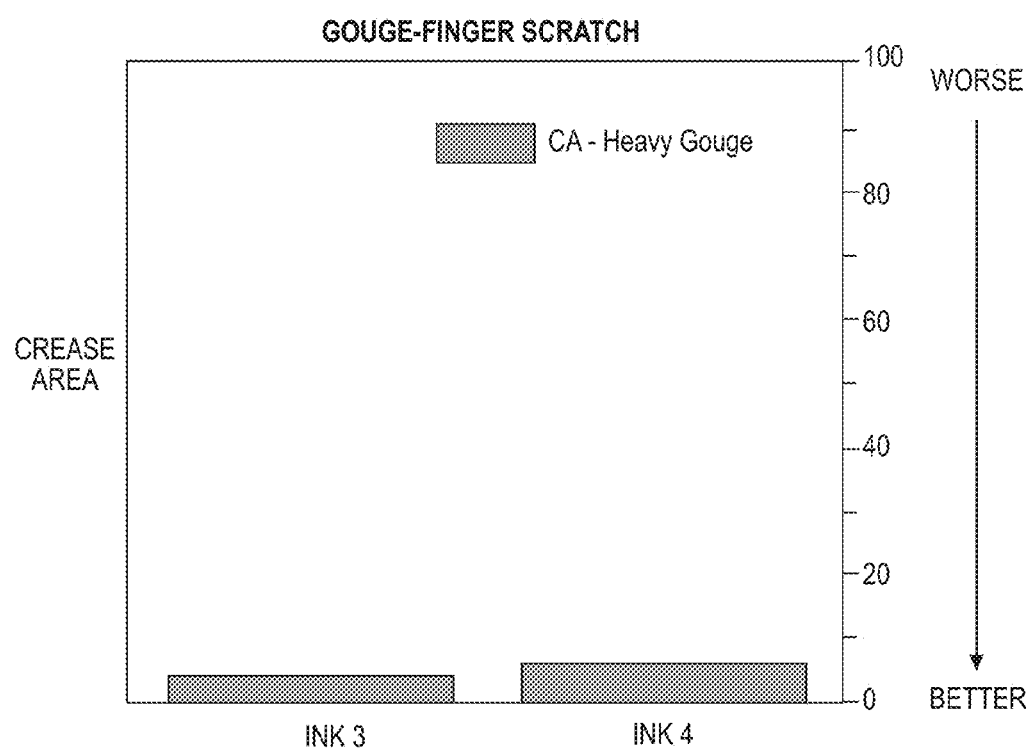
FIG. 3 is a plot of gouge resistance performance for inks as disclosed herein.

FIG. 3 shows the gouge testing results using the heavy weight load (the most extreme scratch tester) for Inks 3 and 4 compared to the commercial ink. As the results indicate, the Example inks showed more than a 20× improvement in scratch resistance compared to the commercial ink.

Contact Angle and Surface Free Energy

Contact angle of the prints generated in Example VI was using a Fibro DAT1100 instrument. The surface free energy (SFE) of the K-proof solid ink prints was calculated based on the contact angles measured with three liquids (water, formamide and diiodomethane), and using Lewis Acid-Base theory which defines the solid-liquid interfacial free energy by the following equation:

$$\gamma_j(1+\cos\theta_j) = 2(\gamma_s^{LW}\gamma_j^{LW})^{\frac{1}{2}} + 2(\gamma_s^-\gamma_j^+)^{\frac{1}{2}} + 2(\gamma_s^+\gamma_j^-)^{\frac{1}{2}}$$

where (LW), (+), (−) are respectively the dispersive, acid and base components of the SFE index, j refers to liquids 1, 2, 3, $\theta_j$ is the contact angle of the liquid j on the substrate, $\gamma_j$ is the surface tension of liquid j, and subscript s refers to the solid. The theoretical values for these parameters for the three test liquids are shown in the table below:

| Liquid | $\gamma$ erg/cm$^2$) | $\gamma^{LW}$ (erg/cm$^2$) | $\gamma^+$ (erg/cm$^2$) | $\gamma^-$ (erg/cm$^2$) |
|---|---|---|---|---|
| Water | 72.8 | 21.8 | 25.5 | 25.5 |
| Formamide | 58 | 39 | 2.28 | 39.6 |
| Diiodomethane | 50.8 | 50.8 | 0 | 0 |

Surface free energy was calculated on Inks 1 and 2 and found to be 26.6 and 25.3 milliNewtons per meter (mN/m), respectively. For comparative purposes, the surface free energy of a commercial ink was also calculated and found to be 24.4 mN/m. The surface energy of the substrate (XEROX® DIGITAL COLOR ELITE GLOSS) was high (40-42 mN/m). Inks 1 and 2 are expected to have better spread compared to the commercial ink because they exhibited slightly higher surface free energy. The Dynamic Contact Angle was measured over a 6 second time period for Inks 1 and 2 and it was found that data for the two examples inks were relatively constant over the time period, having contact angle that changed by at most 5°. Dynamic contact angle in water for Ink 1 was 105-103° and for Ink 2 was 102-97°. The dynamic contact angle in water for the comparative commercial ink was 111°. Inks 1 and 2 had lower contact angle and they are expected to have better spread compared to the commercial ink.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:
1. A phase change ink comprising an ink carrier which comprises:
(a) a crystalline component which is a trans-cinnamic diester, a diester of tartaric acid, a diurethane, or a mixture thereof, wherein said diurethane is of the formula

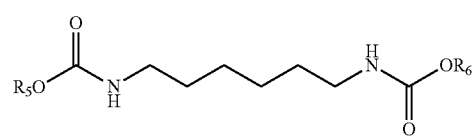

wherein $R_5$ and $R_6$ each, independently of the other, is benzyl, 2-phenylethyl, 2-phenoxyethyl, $C_6H_5(CH_2)_4$—, cyclohexyl, 2-methylcyclohexyl, 3-methylcyclohexyl, 4-methylcyclohexyl, 3-phenylpropanyl, cyclohexylmethyl, 2-methylcyclohexylmethyl, 3-methylcyclohexylmethyl, 4-methylcyclohexylmethyl or 4-ethylcyclohexyl, and (b) an amorphous rosin ester.

2. An ink according to claim 1 further comprising a colorant.

3. An ink according to claim 1 wherein the crystalline component is a trans-cinnamic diester.

4. An ink according to claim 3 wherein the trans-cinnamic diester is propane-1,3-trans-cinnamate, butane-1,4-trans-cinnamate, hexane-1,6-trans-cinnamate, trans-cyclohexane-1,4-dimethanol-trans-cinnamate, para-phenyl-1,4-dimethanol-trans-cinnamate, bis(hydroxymethyl)furan-trans-cinnamate, 2,5-dihydroxymethyl-tetrahydrofuran-trans-cinnamate, trans-cinnamic acid-2,3-butanediol ester, or a mixture thereof.

5. An ink according to claim 1 wherein the crystalline component is a diester of tartaric acid.

6. An ink according to claim 5 wherein the diester of tartaric acid is dibenzyl-L-tartrate, diphenethyl-L-tartrate, bis(3-phenyl-1-propyl)-L-tartrate bis(2-phenoxyethyl)-L-tartrate, diphenyl-L-tartrate, bis(4-methylphenyl)-L-tartrate, bis(4-methoxyphenyl)-L-tartrate, bis(4-methylbenzyl-L-tartrate, bis(4-methoxybenzyl)-L-tartrate, dicyclohexyl-L-tartrate, bis(4-tert-butylcyclohexyl)-L-tartrate, or mixtures thereof.

7. An ink according to claim 1 wherein the crystalline component is present in the ink in an amount of from about 60 to about 95 percent by weight of the ink carrier.

8. An ink according to claim 1 wherein the amorphous rosin ester is present in the ink in an amount of from about 5 to about 40 percent by weight of the ink carrier.

9. A phase change ink comprising an ink carrier which comprises:
(1) a crystalline component; and
(2) an amorphous rosin ester, wherein the amorphous rosin ester is (a) of the formula

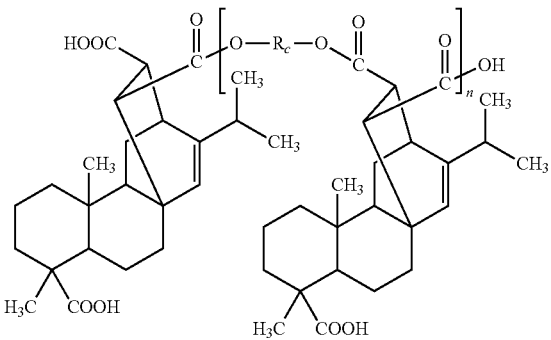

wherein $R_c$ is:
(i) an alkylene group, including substituted unsubstituted alkylene groups, and wherein hetero atoms either may or may not be present in the alkylene group;
(ii) an arylene group, including substituted and unsubstituted arylene groups, and wherein hetero atoms either may or may not be present in the arylene group;
(iii) an arylalkylene group, including substituted and unsubstituted arylalkylene groups, and wherein hetero atoms either may or may not be present in either or both of the alkyl portion and the aryl portion of the arylalkylene group; or
(iv) an alkylarylene group, including substituted and unsubstituted alkylarylene groups, and wherein hetero atoms either may or may not be present in either or both of the alkyl portion and the aryl portion of the alkylarylene group; and n is an integer representing the number of repeat monomer units; or (b) of the formula

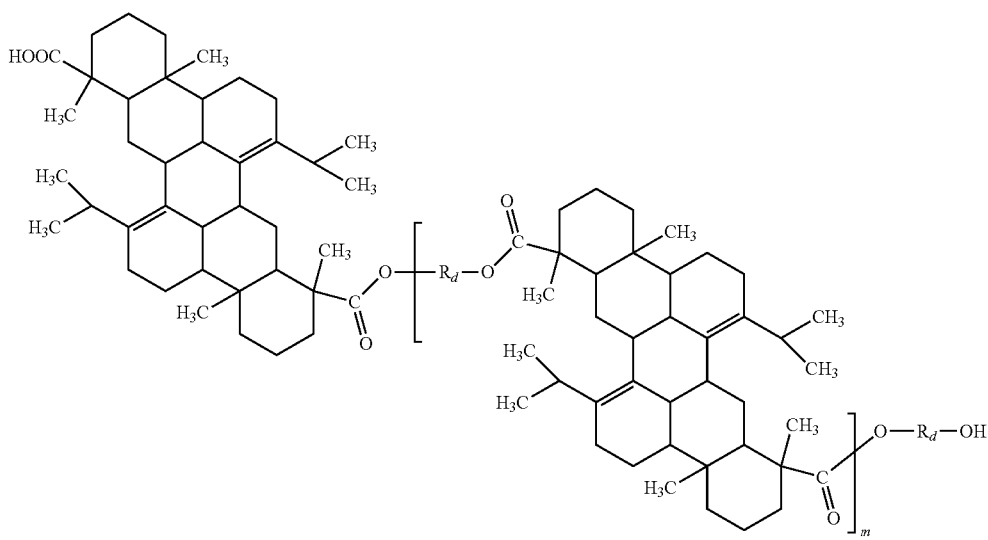

wherein $R_d$ is:
  (i) in alkylene group, including substituted unsubstituted alkylene groups, and wherein hetero atoms either may or may not be present in the alkylene group;
  (ii) an arylene group, including substituted and unsubstituted arylene groups, and wherein hetero atoms either may or may not be present in the arylene group;
  (iii) an arylalkylene group, including substituted and unsubstituted arylalkylene groups, and wherein hetero atoms either may or may not be present in either or both of the alkyl portion and the aryl portion of the arylalkylene group; or
  (iv) an alkylarylene group, including substituted and unsubstituted alkylarylene groups, and wherein hetero atoms either may or may not be present in either or both of the alkyl portion and the aryl portion of the alkylarylene group; and
m is an integer representing the number of repeat monomer units.

10. An ink according, to claim 9 wherein the amorphous rosin ester is of the formula

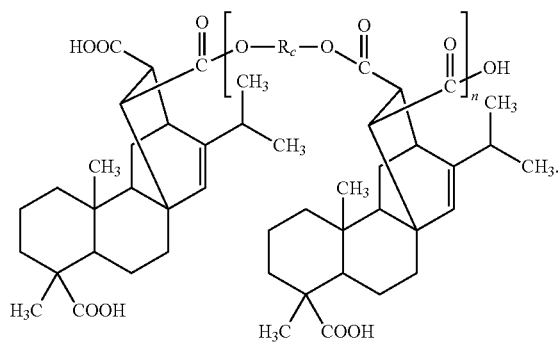

11. An ink according to claim 10 wherein $R_c$ is —(CH$_2$)$_4$—.

12. An ink according to claim 10 wherein $R_c$ is

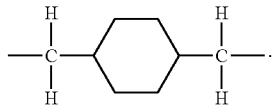

13. An ink according to claim 9 wherein the amorphous rosin ester is of the formula 14. An ink according to claim 13 wherein $R_d$ is —(CH$_2$)$_4$—.

15. An ink according to claim 13 wherein $R_d$ is

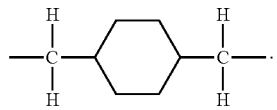

16. An ink according to claim 9 wherein n is from about 2 to about 0 and wherein m is from about 2 to about 10.

17. An ink according to claim 1, said ink exhibiting:
  (1) a melt viscosity within the temperature range of from about 100° C. to about 130° C. of from about 5 to about 22 cps;
  (2) a peak solidification viscosity at about 50° C. of no less than about 1×10$^6$ cps; and
  (3) a hardness at about 25° C. of at least about 70.

18. A phase change ink comprising an ink carrier which comprises:
  (a) a crystalline component, present in the carrier in an amount of from about 60 to about 95 percent by weight of the ink carrier, which is:
    (1) a trans-cinnamic diester;
    (2) a diester of tartaric acid; or
    (3) a diurethane; and
  (b) an amorphous rosin ester, present in the ink in an amount of from about 5 to about 40 percent by weight of the ink carrier, which is:
    (1) of the formula

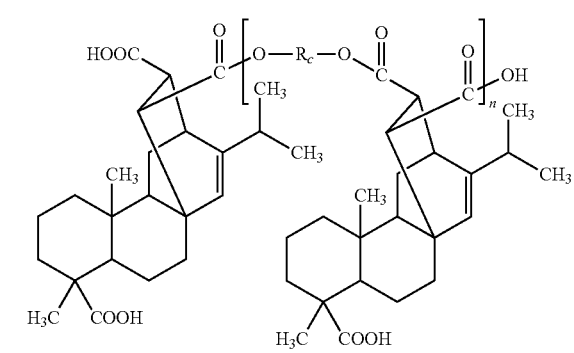

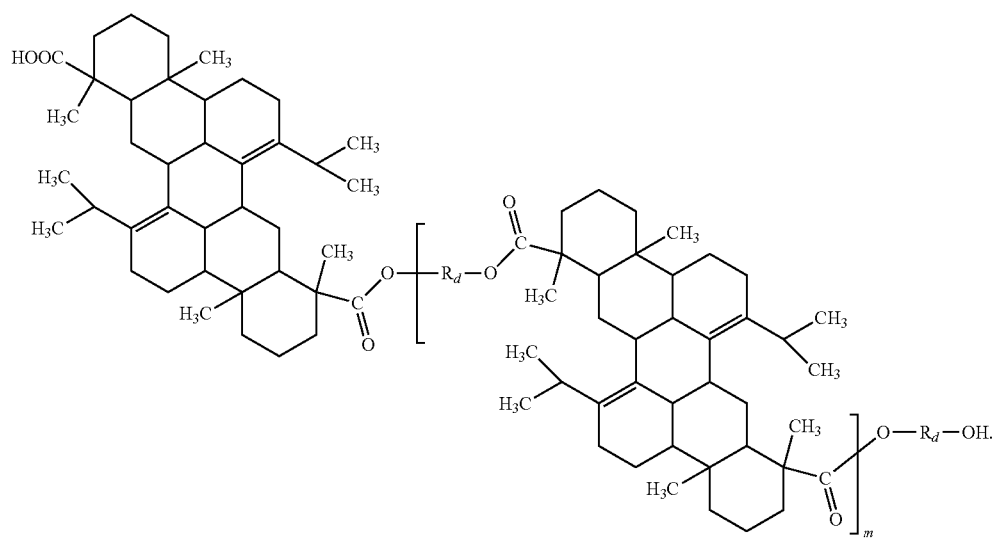

wherein $R_c$ is:
- (i) an alkylene group, including substituted unsubstituted alkylene groups, and wherein hetero atoms either may or may not be present in the alkylene group;
- (ii) an arylene group, including substituted and unsubstituted arylene groups, and wherein hetero atoms either may or may not be present in the arylene group;
- (iii) an arylalkylene group, including substituted and unsubstituted arylalkylene groups, and wherein hetero atoms either may or may not be present in either or both of the alkyl portion and the aryl portion of the arylalkylene group; or
- (iv) an alkylarylene group, including substituted and unsubstituted alkylarylene groups, and wherein hetero atoms either may or may not be present in either or both of the alkyl portion and the aryl portion of the alkylarylene group; and n is an integer representing the number of repeat monomer units; or (2) of the formula

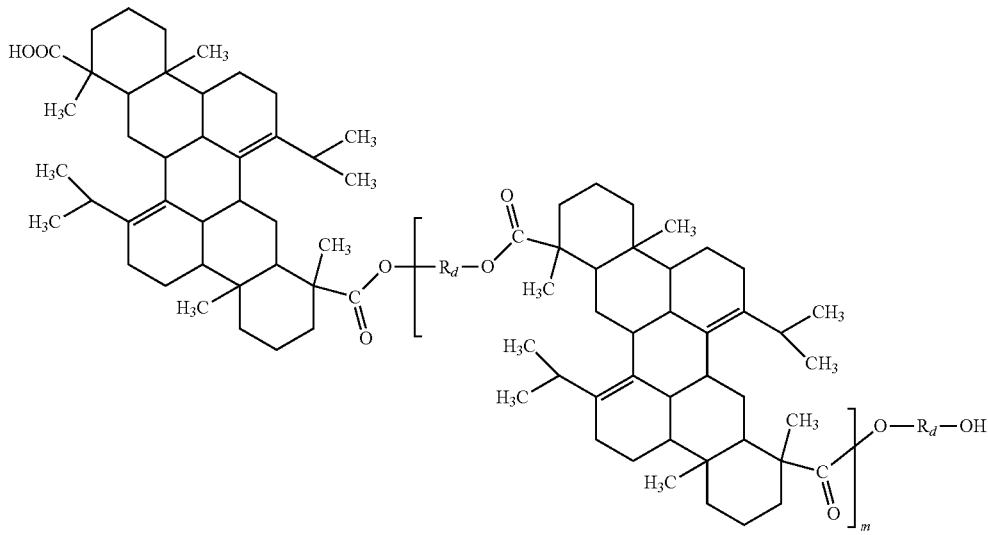

wherein $R_d$ is:
- (i) an alkylene group, including substituted unsubstituted alkylene groups, and wherein hetero atoms either may or may not be present in the alkylene group;
- (ii) an arylene group, including substituted and unsubstituted arylene groups, and wherein hetero atoms either may or may not be present in the arylene group;
- (iii) an arylalkylene group, including substituted and unsubstituted arylalkylene groups, and wherein hetero atoms either may or may not be present in either or both of the alkyl portion and the aryl portion of the arylalkylene group; or
- (iv) an alkylarylene group, including substituted and unsubstituted alkylarylene groups, and wherein hetero atoms either may or may not be present in either or both of the alkyl portion and the aryl portion of the alkylarylene group; and m is an integer representing the number of repeat monomer units;

said ink exhibiting:
- (A) a peak melting point of no more than about 150° C.;
- (B) an onset crystallization temperature of no less than about 60° C.;
- (C) a melt viscosity within the temperature range of from about 100° C. to about 130° C. of from about 5 cps to about 22 cps;
- (D) a peak solidification viscosity at about 50° C. of no less than about $1\times10^6$ cps; and
- (E) a hardness at about 25° C. of at least about 70.

* * * * *